US012635032B2

(12) United States Patent
Do et al.

(10) Patent No.: US 12,635,032 B2
(45) Date of Patent: May 19, 2026

(54) CONSIDERATION OF ACTIVE RECEPTION STATUS IN RESOURCE SELECTION FOR D2D COMMUNICATION

(71) Applicant: Telefonaktiebolaget LM Ericsson (publ), Stockholm (SE)

(72) Inventors: Hieu Do, Järfälla (SE); Shehzad Ali Ashraf, Aachen (DE); Zhang Zhang, Beijing (CN); Ricardo Blasco Serrano, Espoo (FI); Antonino Orsino, Kirkkonummi (FI); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 403 days.

(21) Appl. No.: 18/025,038

(22) PCT Filed: Sep. 10, 2021

(86) PCT No.: PCT/EP2021/074959
§ 371 (c)(1),
(2) Date: Mar. 7, 2023

(87) PCT Pub. No.: WO2022/053627
PCT Pub. Date: Mar. 17, 2022

(65) Prior Publication Data
US 2023/0319950 A1      Oct. 5, 2023

(30) Foreign Application Priority Data
Sep. 11, 2020      (WO) ................ PCT/CN2020/114809

(51) Int. Cl.
*H04W 76/28*      (2018.01)
*H04W 52/02*      (2009.01)

(52) U.S. Cl.
CPC ....... *H04W 76/28* (2018.02); *H04W 52/0216* (2013.01)

(58) Field of Classification Search
None
See application file for complete search history.

(56) References Cited

U.S. PATENT DOCUMENTS

2022/0369292 A1* 11/2022 Hui .................... H04W 72/0446
2023/0098973 A1* 3/2023 Yang ..................... H04W 72/30
370/312

FOREIGN PATENT DOCUMENTS

CN      111480391 A      7/2020
EP      3316536 A1      5/2018
(Continued)

OTHER PUBLICATIONS

"3GPP TS 23.682 V16.7.0", 3rd Generation Partnership Project; Technical Specification Group Services and System Aspects; Architecture enhancements to facilitate communications with packet data networks and applications (Release 16), Jul. 2020, 134 pages.
(Continued)

*Primary Examiner* — Walter J Divito
(74) *Attorney, Agent, or Firm* — Murphy, Bilak & Homiller, PLLC

(57) ABSTRACT

A wireless communication device (10) determines that a further wireless communication device (10) is configured to switch between an inactive reception state and an active reception state. Based on when the further wireless communication device (10) will be in the active reception state, the wireless communication device (10) determines a candidate set of radio resources. From the candidate set of radio resources, the wireless communication device (10) selects at
(Continued)

least one radio resource for a D2D transmission from the wireless communication device (10) to the further wireless communication device (10).

18 Claims, 15 Drawing Sheets

(56)                   References Cited

FOREIGN PATENT DOCUMENTS

| | | | |
|----|------------|----|--------|
| EP | 3319381    | A1 | 5/2018 |
| EP | 3499975    | A1 | 6/2019 |
| EP | 3855860    | A1 | 7/2021 |
| WO | 2018064477 | A1 | 4/2018 |
| WO | 2020064553 | A1 | 4/2020 |

OTHER PUBLICATIONS

"Resource Allocation Schemes for Nr V2X Communication", 3GPP TSG RAN WG1 Meeting #96, R1-1902484, Intel Corporation, Athens, Greece, Feb. 25-Mar. 1, 2019, 18 pages.

3GPP , "3rd Generation Partnership Project; Technical Specification Group Radio Access Network; NR; Medium Access Control (MAC) protocol specification (Release 15)", 3GPP TS 38.321 V15.8.0, Dec. 2019, 1-78.

3GPP , "3rd Generation Partnership Project; Technical Specification Group Radio Access Network; NR; Medium Access Control (MAC) protocol specification (Release 16)", 3GPP TS 38.321 V16.0.0, Mar. 2020, 1-141.

3GPP , "3rd Generation Partnership Project; Technical Specification Group Radio Access Network; NR; Physical layer procedures for data (Release 16)", 3GPP TS 38.214 V16.2.0, Jun. 2020, 1-163.

3GPP , "3rd Generation Partnership Project; Technical Specification Group Radio Access Network; NR; Study on NR Vehicle-to-Everything (V2X) (Release 16)", 3GPP TR 38.885 V16.0.0, Mar. 2019, 1-122.

LG Electronics , "New WID on NR sidelink enhancement", 3GPP TSG RAN Meeting #86, RP-193231, (revision of RP-193134), Sitges, Spain, Dec. 9-12, 2019, 1-6.

* cited by examiner

1010 ——— Module 1:
Configuring selection process

1000

1020 ——— Module 2:
Determine switching between
active and inactive reception states 1030 ——— Module 3:
Determining candidate set 1040 ——— Module 4:
Estimating occupation status 1050 ——— Module 5:
Selecting resource(s)

1060 ——— Module 6:
Performing D2D transmission

WIRELESS COMMUNICATION DEVICE

1110 — Configure selection process

1120 — Switching between active reception state and inactive reception state

1130 — Estimate occupation status

1140 — Select resource(s)

1150 — Perform D2D transmission

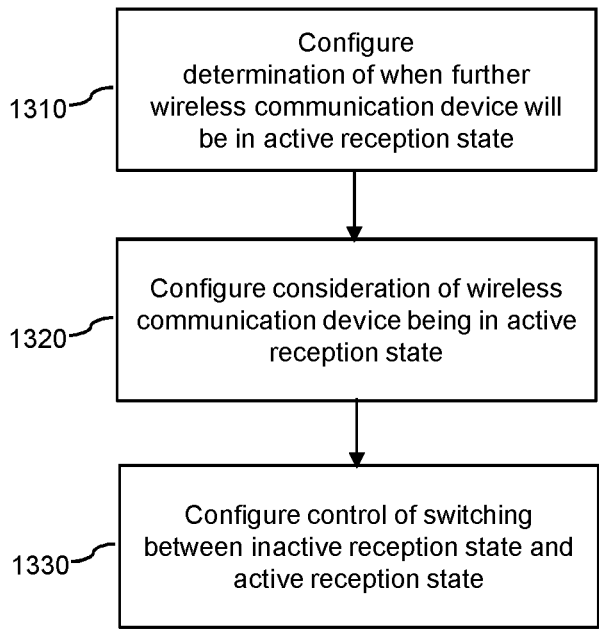

1310 — Configure determination of when further wireless communication device will be in active reception state 1320 — Configure consideration of wireless communication device being in active reception state 1330 — Configure control of switching between inactive reception state and active reception state

FIG. 13

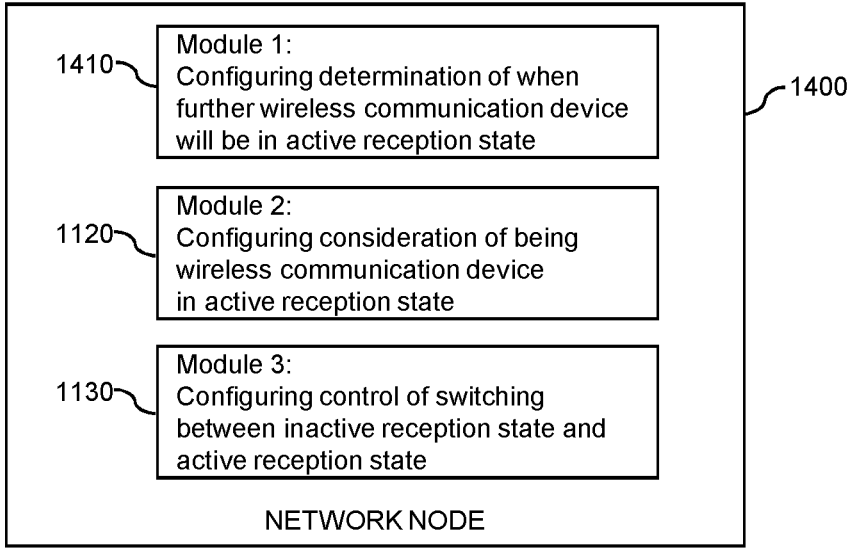

1410 — Module 1:
Configuring determination of when further wireless communication device will be in active reception state 1120 — Module 2:
Configuring consideration of being wireless communication device in active reception state 1130 — Module 3:
Configuring control of switching between inactive reception state and active reception state

NETWORK NODE

CONSIDERATION OF ACTIVE RECEPTION STATUS IN RESOURCE SELECTION FOR D2D COMMUNICATION

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP ($3^{rd}$ Generation Partnership Project), also support D2D communication modes to enable direct communication between UEs (user equipments), sometimes also referred to as sidelink (SL) communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019-03).

SL communication in the NR technology supports the following transmission modes, which are sometimes referred to as casting modes:

Broadcast, which is not addressed to any specific UE but to any UE that may be interested. This type of transmission does not involve feedback from receiver to transmitted.

Unicast, which is addressed to one specific UE. The receiver of the transmission may provide HARQ (Hybrid Automatic Repeat Request) feedback in the form of a positive acknowledgement (ACK) or a negative acknowledgement (NACK), also denoted as HARQ-ACK and HARQ-NACK, respectively.

Groupcast, which is addressed to a specific group of UEs. For groupcast, two variants can be distinguished. In a first variant a receiver may provide feedback in the form of a HARQ-NACK only. Accordingly, a receiver informs the receiver only about incorrectly decoded transmissions of data. In a second variant, a receiver may provide feedback in the form of a HARQ-ACK or HARQ-NACK.

Accordingly, in the NR technology, also more targeted V2X services can be considered, by also utilizing groupcast, multicast, or unicast transmissions, in which the intended receiver of a message consists of only a subset of the receivers within a certain range of the transmitter (groupcast) or of a single receiver (unicast). For example, in a platooning service for vehicles there may be certain messages that are only of interest for a member vehicle of the platoon, so that the member vehicles of the platoon can be efficiently targeted by a groupcast transmission. In another example, the see-through functionality, where one vehicle provides video data from a front facing camera to a following vehicle, may involve V2X communication of only a pair of vehicles, for which unicast transmissions may be a preferred choice.

Furthermore, NR SL communication supports D2D communication of UEs with and without network coverage, with varying degrees of interaction between the UEs and the network, including the possibility of standalone, networkless operation.

Further potential use cases of D2D communication include NSPS (National Security and Public Safety), Network Controlled Interactive Service (NCIS), and for railways. In order to provide a wider coverage of NR SL for such use cases, it further enhancements of the NR SL technology are being considered. One of such enhancements is power saving which enables UEs with battery constraint to perform SL operations in a power efficient manner. For example, 3GPP work item description "NR Sidelink Enhancement", document RP-193231, TSG RAN Meeting #86 (2019-12), suggests investigation of ways to improvement of performance for power limited UEs, e.g., like pedestrian UEs, UEs associated with first responders, or the like.

For SL communication in the LTE technology and in the NR technology, there are in principle two resource allocation modes: A first resource allocation mode uses network-based resource allocation. In this case the network selects the resources and other transmit parameters to be used for an SL transmission. In some cases, the network may control every single SL transmission parameter. In other cases, the network may select the resources to be used for transmission but may give the transmitting UE some freedom to select transmission parameters, possibly with some restrictions. In the NR technology, this resource allocation mode is denoted as "Mode 1". A second resource allocation mode uses autonomous resource allocation. In this case the UEs autonomously select the resources and other transmit parameters to be used for an SL transmission. In this mode, the resource allocation may be accomplished without assistance by the network, which is for example useful for out-of-coverage UEs, when using unlicensed carriers, or for operation without a network deployment. In some cases, there may be minimal assistance by the network, e.g., by configuration of pools of resources, or the like. In the NR technology, this autonomous resource allocation mode is denoted as "Mode 2".

The Mode 2 resource allocation of the NR technology uses a distributed resource selection mechanism, i.e., there is no central node for scheduling and UEs engaged in SL communication have equal responsibilities in the autonomous resource selection process. Here, the Mode 2 resource allocation is based on two functionalities: reservation of future resources and sensing-based resource allocation. Reservation of future resources is accomplished by the UE sending an SL transmission also notifying receivers of the SL transmission about its intention to transmit using certain time-frequency resources at a later point in time. For example, a UE transmitting at time T may inform the receivers that it will transmit using the same frequency resources at time T+100 ms. This resource reservation allows UEs to utilize the reservations to predict the utilization of the radio resources in the future. Accordingly, by listening to the current transmissions of another UE, a UE also obtains information about potential future transmissions intended by the other UE. This information can be used by the UE to avoid collisions when selecting its own resources. More specifically, a UE may predict the future utilization of the radio resources by reading received booking messages and may then schedule its current transmission to avoid selecting the same resources. This is also known as sensing-based resource selection. Additionally, shortly before transmitting in a reserved resource, the UE can re-evaluate the set of reserved resources to take into account the latest status of resource usage, e.g., if some of the resources might have been occupied by an aperiodic transmission after the resource reservation. If the reserved resources would not be part of the set for selection at this time, then new resources may be selected from an updated resource selection window. In addition to the re-evaluation, pre emption may be used. In the case of pre-emption a UE may select new resources even after it announced the resource reservation when it observes resource collision with a higher priority transmission from another UE. Details on the sensing-based resource selection can for example be found in 3GPP TS 38.214 V16.2.0 (2020-07).

The sensing-based resource selection can be summarized to include the following steps:

a) A UE senses the transmission medium during an interval [n–a, n–b], where n is a time reference, and a>b≥0 define the duration of the sensing window. The length of the sensing window is (pre-)configurable.

b) Based on the sensing results, the UE predicts the future utilization of the transmission medium at a future time interval [n+T1, n+T2], where T2>T1≥0. The interval [n+T1, n+T2] is the resource selection window.

c) The UE selects one or more time-frequency resources among the resources in the selection window [n+T1, n+T2] that are predicted to be selectable (e.g., idle, usable, available, etc.).

For sidelink communication in the LTE technology, two procedures for resource selection in a transmission mode denoted as "Mode 4" were introduced, which aim at enabling reduced power consumption: partial sensing and random selection for pedestrian UEs. In case of partial sensing, the pedestrian UE uses a reduced selection/sensing window which is a subset of the selection/sensing window used when performing normal sensing. In this way, partial sensing allows for reducing power consumption at the expense of a moderate increase in resource collision probability. in the case of random selection, the UE skips sensing altogether. The latter variant may provide significant benefits in terms of power saving. However, these benefits may come at the risk of rather high of collision probability.

When a resource selection is triggered, the UE will thus select resources for its transmissions. Further, the UE may also be allowed to select multiple resources by using resource reservations. In particular, in each transmission, the UE can signal to other UEs a reservation of up to two additional resources in the near future, or in some cases a reservation for periodic transmissions using the same frequency resources in the further future. Typically, when the UE performs resource selection, the first selected resource is for the initial transmission of a packet and the additional reserved resources have the purpose of being used for potential retransmissions of the same packet.

The resource re-evaluation and pre-emption described earlier allows a UE to re-select a selected resource if the UE detects that the selected resource, which can be reserved or not-yet-reserved, is occupied by some other UE with higher priority.

Among further enhancements of the NR sidelink technology which are being considered, one of such enhancements is power saving which enables UEs with battery constraint to perform sidelink operations in a power efficient manner. For example, 3GPP work item description "NR Sidelink Enhancement", document RP-193231, TSG RAN Meeting #86 (2019-12), suggests investigation of sidelink Discontinuous Reception (DRX) operation for broadcast, groupcast, and unicast transmission modes, aiming at definition of sidelink DRX configurations and procedures for implementing sidelink DRX in UEs, including mechanisms to align sidelink DRX configurations among the UEs communicating with each other, and mechanisms to align sidelink DRX configurations with DRX configurations for downlink (DL) and uplink (UL) communication via the Uu radio interface. However, appropriate mechanisms and procedures have not yet been developed.

For the NR technology, DRX procedures for DL/UL communication via the Uu radio interface are specified in 3GPP TS 38.321 V16.0.0 (2020-03). On the basis of these procedures, expected UE behavior in terms of reception and processing of transmissions can be controlled. The underlying DRX functionalities are based on defining a DRX active time, sometimes also referred to as active time state or ACTIVE state, in which the UE is expected to receive and process incoming transmissions. For example, the UE is expected to decode the DL control channels, process received grants etc. Outside the DRX active time, in what is also denoted as DRX inactive time, there is no expectation on the UE to receive and process transmissions. Accordingly, an access node, in the NR technology denoted as "gNB", cannot assume that the UE will be listening to DL transmissions. A DRX configuration may also define transitions between states. Typically, UEs that are not in the DRX active time turn off some of their components and enter a low-power mode, e.g., a sleeping mode. To ensure that the UE regularly switches to the DRX active time, i.e., wakes up from the sleeping mode, a DRX cycle is defined. The DRX cycle may basically be based on two parameters: a periodicity of the DRX cycle, which controls how frequently the UE switches to the DRX active time, and a duration of the DRX active time, which controls for how long the UE is in the DRX active state. In addition to this basic DRX cycle, the DRX procedures also define other conditions that may allow the UE to switch between the DRX active time and the DRX inactive time. For example, if a UE is expecting a retransmission from the gNB, the UE may enter the DRX inactive time, e.g., while the gNB prepares the retransmission, and then may enter the DRX active time, which should match a time window in which the gNB is expected to send the retransmission.

However, when using DRX or some other mode of operation where the UEs may switch between an inactive reception state and an active reception state, the existing resource selection mechanisms for sidelink communication might not perform in a satisfactory manner. For example, when the UE selects resources using the processes of Mode 2 resource selection, at least a part of the resulting selected resources could be in time slots where the intended recipient of the sidelink transmission is in the DRX inactive state. of might consist of consecutive time slots. This may result in the recipient UE missing the sidelink transmission. Further, the switching to the DRX inactive state may have an impact on a UEs ability to perform sensing for initial resource selection or re-evaluation or re-selection with respect to an earlier selection. This may in turn result in an increased probability of collisions.

Accordingly, there is a need for techniques which allow for efficiently implementing resource selection for sidelink transmissions and other types of D2D transmission in scenarios where the receiving and/or transmitting device can use switching between an active reception state and an inactive reception state, e.g., as in the case of DRX.

SUMMARY

According to an embodiment, a method of controlling D2D communication in a wireless communication network is provided. According to the method, a wireless communication device determines that a further wireless communication device is configured to switch between an inactive reception state and an active reception state. Based on when the further wireless communication device will be in the active reception state, the wireless communication device determines a candidate set of radio resources. From the candidate set of radio resources, the wireless communication device selects at least one radio resource for a D2D transmission from the wireless communication device to the further wireless communication device.

According to a further embodiment, a method of controlling D2D communication in a wireless communication network is provided. According to the method, a wireless communication device switches between an inactive reception state and an active reception state. In response to the wireless communication device being in the active reception state, the wireless communication device monitors radio resources to estimate an expected occupation status of radio resources in a candidate set of radio resources. Based on the estimated expected occupation status of the radio resources in the candidate set of radio resources, the wireless communication device selects at least one radio resource for a D2D transmission from the wireless communication device to a further wireless communication device.

According to a further embodiment, a method of controlling D2D communication in a wireless communication network is provided. According to the method, a node of the wireless communication network configures a wireless communication device to:

determine that a further wireless communication device is configured to switch between an inactive reception state and an active reception state;

based on when the further wireless communication device will be in the active reception state, determine a candidate set of radio resources; and from the candidate set of radio resources, select at least one radio resource for a D2D transmission from the wireless communication device to the further wireless communication device.

According to a further embodiment, a method of controlling D2D communication in a wireless communication network is provided. According to the method, a node of the wireless communication network configures a wireless communication device to:

if the wireless communication device switches between an inactive reception state and an active reception state:

in response to the wireless communication device being in an active reception state, monitor radio resources to estimate an expected occupation status of radio resources in the candidate set of radio resources; and based on the estimated expected occupation status of the radio resources in the candidate set of radio resources, select at least one radio resource for a D2D transmission from the wireless communication device to a further wireless communication device.

According to a further embodiment, a wireless communication device is provided. The wireless communication device is configured to determine that a further wireless communication device is configured to switch between an inactive reception state and an active reception state. Further, the wireless communication device is configured to, based on when the further wireless communication device will be in the active reception state, determine a candidate set of radio resources. Further, the wireless communication device is configured to select, from the candidate set of radio resources, at least one radio resource for a D2D transmission from the wireless communication device to the further wireless communication device.

According to a further embodiment, a wireless communication device is provided. The wireless communication device comprises at least one processor and a memory. The memory contains instructions executable by said at least one processor, whereby the wireless communication device is operative to determine that a further wireless communication device is configured to switch between an inactive reception state and an active reception state. Further, the memory contains instructions executable by said at least one processor, whereby the wireless communication device is operative to, based on when the further wireless communication device will be in the active reception state, determine a candidate set of radio resources. Further, the memory contains instructions executable by said at least one processor, whereby the wireless communication device is operative to select, from the candidate set of radio resources, at least one radio resource for a D2D transmission from the wireless communication device to the further wireless communication device.

According to a further embodiment, a wireless communication device is provided. The wireless communication device is configured to switch between an inactive reception state and an active reception state. Further, the wireless communication device is configured to, in response to the wireless communication device being in the active reception state, monitor radio resources to estimate an expected occupation status of radio resources in a candidate set of radio resources. Further, the wireless communication device is configured to select, based on the estimated expected occupation status of the radio resources in the candidate set of radio resources, at least one radio resource for a D2D transmission from the wireless communication device to a further wireless communication device.

According to a further embodiment, a wireless communication device is provided. The wireless communication device comprises at least one processor and a memory. The memory contains instructions executable by said at least one processor, whereby the wireless communication device is operative to switch between an inactive reception state and an active reception state. Further, the memory contains instructions executable by said at least one processor, whereby the wireless communication device is operative to, in response to the wireless communication device being in the active reception state, monitor radio resources to estimate an expected occupation status of radio resources in a candidate set of radio resources. Further, the memory contains instructions executable by said at least one processor, whereby the wireless communication device is operative to select, based on the estimated expected occupation status of the radio resources in the candidate set of radio resources, at least one radio resource for a D2D transmission from the wireless communication device to a further wireless communication device.

According to a further embodiment, a node for a wireless communication network is provided. The node is adapted to configure a wireless communication device to:

determine that a further wireless communication device is configured to switch between an inactive reception state and an active reception state;

based on when the further wireless communication device will be in the active reception state, determine a candidate set of radio resources; and from the candidate set of radio resources, select at least one radio resource for a D2D transmission from the wireless communication device to the further wireless communication device.

According to a further embodiment, a node for a wireless communication network is provided. The node comprises at least one processor and a memory. The memory contains instructions executable by said at least one processor, whereby the node is operative to configure a wireless communication device to:

determine that a further wireless communication device is configured to switch between an inactive reception state and an active reception state;

based on when the further wireless communication device will be in the active reception state, determine a candidate set of radio resources; and from the candidate set of radio resources, select at least one radio resource for a D2D transmission from the wireless communication device to the further wireless communication device.

According to a further embodiment, a node for a wireless communication network is provided. The node is adapted to configure a wireless communication device to:

if the wireless communication device switches between an inactive reception state and an active reception state:

in response to the wireless communication device being in an active reception state, monitor radio resources to estimate an expected occupation status of radio resources in the candidate set of radio resources; and based on the estimated expected occupation status of the radio resources in the candidate set of radio resources, select at least one radio resource for a D2D transmission from the wireless communication device to a further wireless communication device.

According to a further embodiment, a node for a wireless communication network is provided. The node comprises at least one processor and a memory. The memory contains instructions executable by said at least one processor, whereby the node is operative to configure a wireless communication device to:

if the wireless communication device switches between an inactive reception state and an active reception state:

in response to the wireless communication device being in an active reception state, monitor radio resources to estimate an expected occupation status of radio resources in the candidate set of radio resources; and based on the estimated expected occupation status of the radio resources in the candidate set of radio resources, select at least one radio resource for a D2D transmission from the wireless communication device to a further wireless communication device.

According to a further embodiment of the invention, a computer program or computer program product is provided, e.g., in the form of a non-transitory storage medium, which comprises program code to be executed by at least one processor of a wireless communication device. Execution of the program code causes the wireless communication device to determine that a further wireless communication device is configured to switch between an inactive reception state and an active reception state. Further, execution of the program code causes the wireless communication device to, based on when the further wireless communication device will be in the active reception state, determine a candidate set of radio resources. Further, execution of the program code causes the wireless communication device to select, from the candidate set of radio resources, at least one radio resource for a D2D transmission from the wireless communication device to the further wireless communication device.

According to a further embodiment of the invention, a computer program or computer program product is provided, e.g., in the form of a non-transitory storage medium, which comprises program code to be executed by at least one processor of a wireless communication device. Execution of the program code causes the wireless communication device to switch between an inactive reception state and an active reception state. Further, execution of the program code causes the wireless communication device to, in response to the wireless communication device being in the active reception state, monitor radio resources to estimate an expected occupation status of radio resources in a candidate set of radio resources. Further, execution of the program code causes the wireless communication device to select, based on the estimated expected occupation status of the radio resources in the candidate set of radio resources, at least one radio resource for a D2D transmission from the wireless communication device to a further wireless communication device.

According to a further embodiment of the invention, a computer program or computer program product is provided, e.g., in the form of a non-transitory storage medium, which comprises program code to be executed by at least one processor of a node for a wireless communication network. Execution of the program code causes the node to configure a wireless communication device to:

determine that a further wireless communication device is configured to switch between an inactive reception state and an active reception state;

based on when the further wireless communication device will be in the active reception state, determine a candidate set of radio resources; and from the candidate set of radio resources, select at least one radio resource for a D2D transmission from the wireless communication device to the further wireless communication device.

According to a further embodiment of the invention, a computer program or computer program product is provided, e.g., in the form of a non-transitory storage medium, which comprises program code to be executed by at least one processor of a node for a wireless communication network. Execution of the program code causes the node to configure a wireless communication device to:

if the wireless communication device switches between an inactive reception state and an active reception state:

in response to the wireless communication device being in an active reception state, monitor radio resources to estimate an expected occupation status of radio resources in the candidate set of radio resources; and based on the estimated expected occupation status of the radio resources in the candidate set of radio resources, select at least one radio resource for a D2D transmission from the wireless communication device to a further wireless communication device.

Details of such embodiments and further embodiments will be apparent from the following detailed description of embodiments.

BRIEF DESCRIPTION OF THE DRAWINGS

FIG. 13 shows a flowchart for schematically illustrating a further method according to an embodiment.

FIG. 14 shows an exemplary block diagram for illustrating functionalities of a network node implementing functionalities corresponding to the method of FIG. 13.

DETAILED DESCRIPTION

Figure 1:
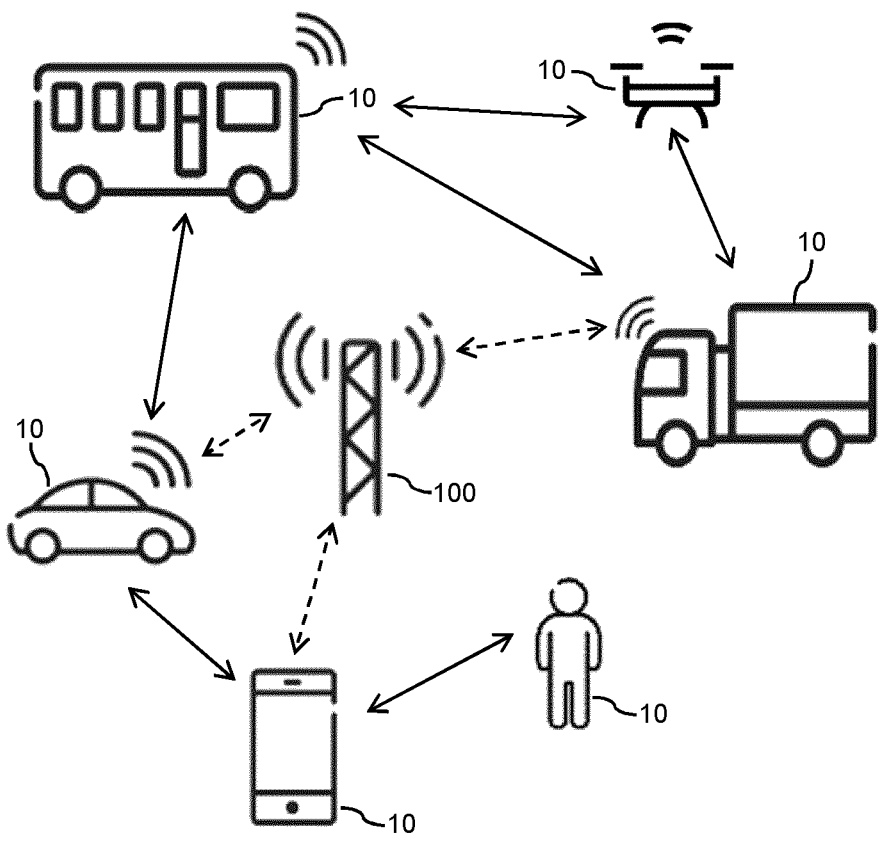
FIG. 1 schematically illustrates an exemplary V2X scenario in which D2D communication may be controlled according to an embodiment of the invention.

In the following, concepts in accordance with exemplary embodiments of the invention will be explained in more detail and with reference to the accompanying drawings. The illustrated embodiments relate to controlling of D2D communication by wireless communication devices.

These wireless communication devices may include various types of UEs or other wireless devices (WDs). As used herein, the term "wireless device" (WD) refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP, e.g., on the PC5 interface of the LTE or NR technology. However, it is noted that the illustrated concepts could also be applied to other radio technologies, e.g., a WLAN (Wireless Local Area Network) technology. In the D2D communication considered herein, a WD may act as a receiver, herein also denoted as RX UE, and/or as a transmitter, herein also denoted as TX UE.

In the illustrated concepts, a TX UE may perform resource selection for D2D communication taking into account that at least one of the involved wireless communication devices, i.e., the TX UE itself or at least one RX UE may switch between an active reception state, in which the wireless communication device is expected to receive and process incoming wireless transmissions, and an inactive reception state, in which the wireless communication device is allowed to switch off at least a part of its receive circuitry to save energy. In the illustrated concepts, the radio resources for a D2D transmission may be selected in such a way that they are adapted to the switching between the active reception state and inactive reception state by one or more RX UEs. This may be achieved by adapting a candidate set of resources used in the resource selection process to match one or more time intervals when the RX UE is in the active reception state, e.g., by considering an expected behavior of the RX UE. The expected behavior may be determined from transmissions to the RX UE, transmissions from the RX UE, and/or from configuration information provided to the RX UE. For example, the TX UE could be aware of a DRX configuration of the RX UE and determine the expected behavior of the RX UE from its knowledge of the DRX configuration. Further, in the illustrated concepts a behavior of the TX UE with respect to sensing radio resources may be adapted to switching between the active reception state and inactive reception state by the TX UE.

In the examples illustrated below, it is assumed that the active reception state and the inactive reception state correspond to a DRX active state and a DRX inactive state, respectively. However, it is noted that the illustrated concepts could also be applied to other types of switching between an active reception state and an inactive reception state, e.g., in connection with a UE power saving mode, as for example described in 3GPP TS 23.682 V16.7.0 (2020 07).

FIG. 1 illustrates an exemplary scenario involving V2X communications. In particular, FIG. 1 shows various UEs 10, which may engage in V2X communication or other D2D communication, illustrated by solid arrows. Further, FIG. 1 shows an access node 100 of a wireless communication network, e.g., an eNB of the LTE technology or a gNB of the NR technology, or an access point of a WLAN. At least some of the UEs 10 may also be capable of communicating by using DL radio transmissions and/or UL radio transmissions, illustrated by broken arrows.

The UEs 10 illustrated in FIG. 1 comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 1 are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device. The V2X communication may also involve utilizing the illustrated mechanisms for resource selection taking into account that at least some of the UEs 10 involved in the V2X communication may switch between an active reception state, in particular a DRX active state and a DRX inactive state.

Figure 2:
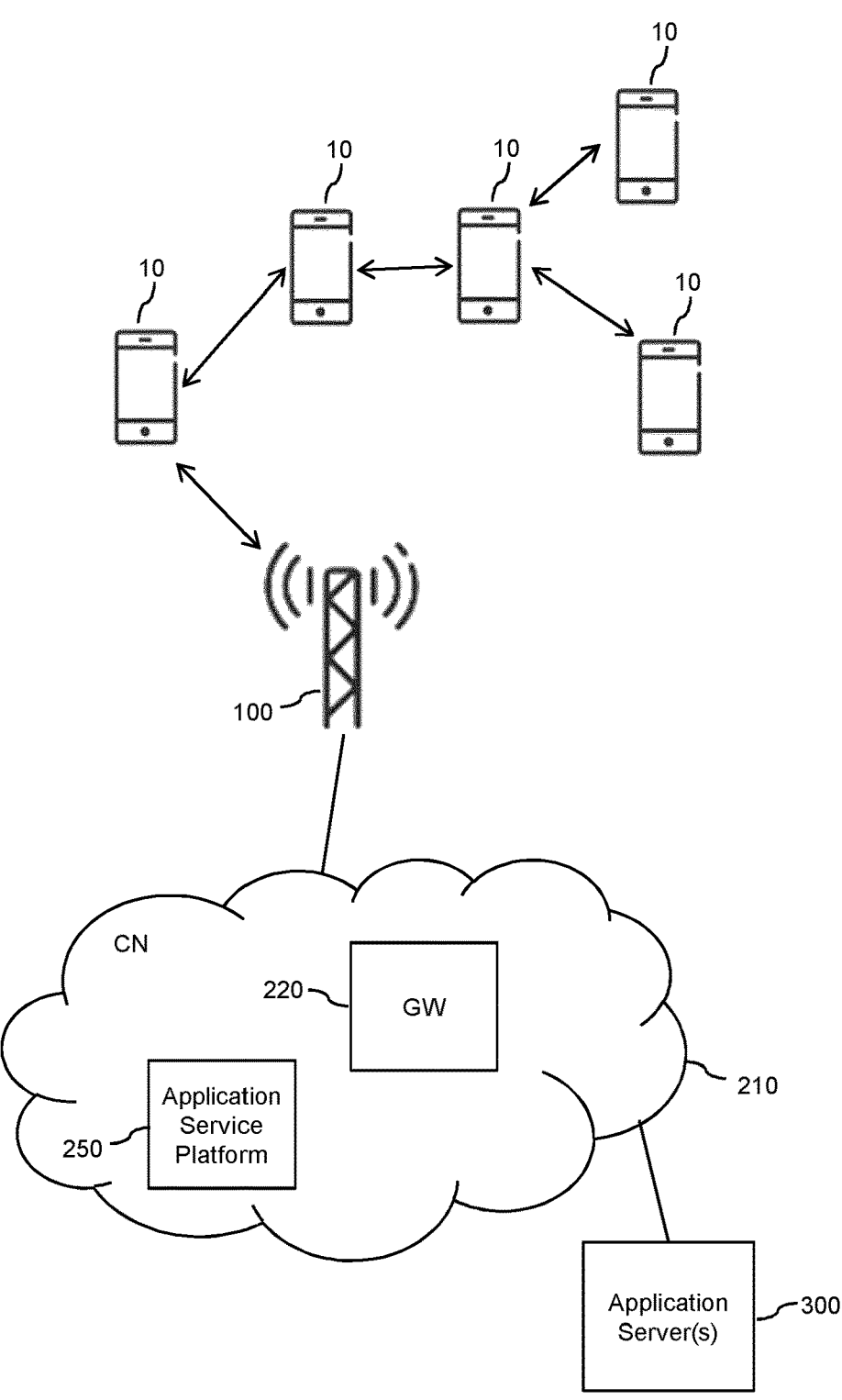
FIG. 2 schematically illustrates an exemplary scenario according to an embodiment of the invention, in which D2D communication may be controlled according to an embodiment.

FIG. 2 illustrates an exemplary D2D communication scenario. In particular, FIG. 2 shows multiple UEs 10, which are connected to each other by radio links implementing direct wireless links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network.

Further, FIG. 2 shows a core network (CN) 210 of the wireless communication network. The CN 210 may provide connectivity of the UEs 10 to other data networks, e.g., through a GW 220 provided in the CN 210. Further, the CN 210 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, an NSPS service, and/or an NCIS service. Such services may be based on applications which are executed on the UE 10 and/or on a device linked to the UE 10. Accordingly, in the illustrated concepts a D2D transmission may convey or correspond to a V2X message, an ITS message, or some other kind of message related to a service. Further, FIG. 2 illustrates an application service platform 250 in the CN 210 of the wireless communication network. Further, FIG. 2 illustrates one or more application servers 300 provided outside the wireless communication network. The application(s) executed on the UE 10 and/or on one or more other devices linked to the UE 10 may use the radio links with one or more other UEs 10, the application service platform 250, and/or the application server(s) 300, thereby enabling the corresponding service(s) on the UE 10. In some scenarios, the services utilized by the UEs 10 may thus be hosted on the network side, e.g., on the application service platform 250 or on the application server (s) 300. However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network. Also in the scenario of FIG. 2, the UEs 10 may apply the illustrated mechanisms for resource selection taking into account that at least some of the UEs 10 involved in the D2D communication may switch between an active reception state, in particular a DRX active state and a DRX inactive state.

In the example of FIG. 2, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 1.

Figure 3:
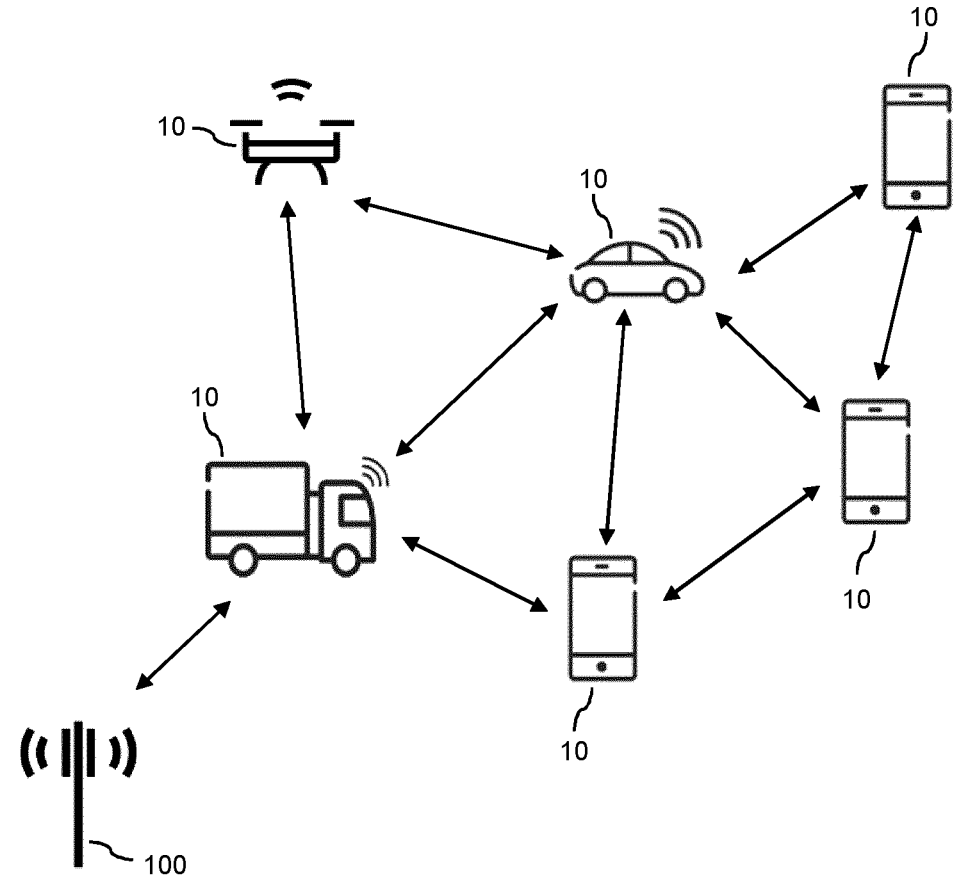
FIG. 3 schematically illustrates an exemplary NSPS communication scenario in which D2D communication may control establishment of a direct wireless link according to an embodiment.

FIG. 3 schematically illustrates an NSPS communication scenario. In particular, FIG. 3 shows multiple UEs 10, which may exchange NSPS messages associated with one or more NSPS services using D2D communication, e.g., based on the LTE sidelink communication or NR sidelink communication. As further illustrated, the NSPS services may be assisted from the network, by exchanging NSPS messages via access node 100. The NSPS services may for example include group communication of rescue vehicles, rescue personnel or other equipment or personnel of public safety related organizations. Such communication may also involve utilizing the illustrated mechanisms for resource selection taking into account that at least some of the UEs 10 involved in the D2D communication may switch between an active reception state, in particular a DRX active state and a DRX inactive state.

As mentioned above, in some scenarios the D2D communication to which the illustrated resource allocation mechanism is applied may be based on the SL mode of the NR or LTE technology, using the PC5 radio interface. In such cases the SL communication may be based on multiple physical channels defined on a physical (PHY) layer of the radio interface between the TX UE and the RX UE, including a Physical sidelink control channel (PSCCH), a Physical sidelink shared channel (PSSCH), a Physical sidelink feedback channel (PSFCH), and a Physical sidelink broadcast channel (PSBCH). The data decoded from the PHY layer may then be further processed by an MAC (Medium Access Control) entity of the RX UE.

The PSCCH carries only control information, usually referred to as the first-stage SCI (Sidelink Control Information). It is transmitted using a predefined format in predetermined radio resources, allowing a RX UE to use blind decoding. That is, a RX UE attempts to decode PSCCH according to the predefined format in the predetermined radio resources, without knowing beforehand whether a PSCCH was indeed transmitted or not. If the decoding operation succeeds, the RX UE assumes that a PSCCH was transmitted. Otherwise, it assumes no PSCCH was transmitted. The PSCCH carries information that is necessary to decode the PSSCH.

The PSSCH carries both control information and data payload. The control information is usually referred to as the second-stage SCI. It is transmitted using the radio resource allocation and transmission format indicated in PSCCH. It contains further information that is necessary to decode the data payload carried by PSSCH too.

The PSFCH carries only feedback information. The contents of PSFCH depends on the mode of HARQ operation. In some cases, both positive (also denoted as ACK) and negative (also denoted as NACK) acknowledgements are transmitted. In other cases, only NACK is transmitted. PSFCH transmission uses a predefined format and takes place in predetermined radio resources.

The PSBCH carries basic system configuration information, e.g., concerning bandwidth, TDD (time-division duplexing) configuration, or the like. Further, the PSBCH carries synchronization signals.

For the SL communication, a typical operation may be as follows: A first UE performs an SL transmission on the PSCCH and PSSCH. The resources used for the SL transmission are selected by the first UE, e.g., using a sensing based resource selection process or using a resource selection process without sensing, such as a random selection based resource selection process. A second UE receives the SL transmission. Receiving the SL transmission may involve that, by means of blind decoding, the second UE detects the PSCCH and decodes the first-stage SCI carried by the PSCCH. If the blind decoding is successful, the second UE uses the decoded contents of the PSCCH to decode second-stage SCI carried by the PSSCH. Having decoded the second-stage SCI, the second UE uses the first-stage SCI and the second-stage SCI to decodes payload data carried by the PSSCH. Having successfully decoded the payload data, the second UE proceeds to transmit HARQ (Hybrid Automatic Repeat Request) feedback on the PSFCH. Different modes of providing the HARQ feedback may be utilized. The first UE expects to receive the HARQ feedback from the second UE and may use the presence and contents of the PSFCH to determine further actions, e.g., whether to perform a retransmission or not. Accordingly, the PSDCH may be is used to trigger actions related to HARQ operation for the SL transmission. The utilization of the HARQ feedback may also be omitted in some cases. For example, HARQ feedback is typically not utilized for SL transmissions in broadcast mode. The TX UE (e.g., the first UE in the considered example) may indicate in the SCI whether or not it expects the RX UE (e.g., the second UE in the considered example) to transmit the PSFCH with HARQ feedback.

The DRX operation for SL transmissions may be based on configuring, as part of a SL DRX configuration of the UE, one or more timers and parameters to control switching of the UE between the active time and the inactive time. In particular, these timers and parameters may include one or more of the following:

a timer denoted as "drx-onDurationTimerSL", which defines a duration at the beginning of a SL DRX cycle;

a parameter denoted as "drx-SlotOffsetSL", which defines a delay before starting the timer drx-onDurationTimerSL;

a parameter denoted as "drx-LongCycleStartOffsetSL", which defines a long SL DRX cycle;

a parameter denoted as "drx-StartOffsetSL", which defines a subframe where the (long or short) SL DRX cycle starts;

an optional parameter denoted as "drx-ShortCycleSL", which defines a short SL DRX cycle;

an optional timer denoted as "drx-ShortCycleTimerSL" which denotes a duration for which the UE shall follow the short SL DRX cycle;

a timer denoted as "drx-InactivityTimerSL", which defines a duration after receiving the PSCCH/PSSCH occasion including SCI information which indicates a new SL transmission for the MAC entity;

a timer denoted as "drx-RetransmissionTimerSL", which defines a maximum duration until a SL retransmission is received, typically defined per SL HARQ process, except for the broadcast SL transmissions;

a timer denoted as "drx-HARQ-RTT-TimerSL", which defines a minimum duration before a SL retransmission grant on the PSCCH for SL HARQ retransmission is expected by the MAC entity, typically defined per SL HARQ process, except for the broadcast SL transmissions;

a timer denoted as "drx-HARQ-FB-TimerSL", which defines a maximum duration until an SL HARQ feedback is received, typically defined per SL HARQ process, except for the broadcast SL transmissions;

a timer denoted as "drx-HARQ-FB-RTT-TimerSL", which defines, if HARQ feedback is required for a given PSSCH transmission, a minimum duration before an SL HARQ feedback on PSFCH is expected after the associated PSSCH transmission, typically defined per SL HARQ process, except for the broadcast SL transmissions;

a timer denoted as "drx-CSIReport-TimerSL", which defines a maximum duration until an SL CSI (Channel State Information) report is received;

a timer denoted as "drx-CSIReport-RTT-TimerSL", which defines a minimum duration before an SL transmission grant on the PSCCH for CSI report is expected by the MAC entity;

a timer denoted as "drx-Retx-Proc-TimerSL", which defines a minimum duration before the next blind retransmission is expected, typically defined per SL HARQ process;

a timer denoted as "drx-BlindRetransmissionTimerSL", which defines a maximum duration until the next blind retransmission is received or, alternatively, a maximum duration until all blind retransmissions of an SL transmission are received or a maximum number of blind retransmissions for an SL transmission, typically defined per SL process.

Due to their usage in controlling SL DRX operation, the above-mentioned timers may also be referred to as "SL DRX timers". It is noted that the names of the above timers and parameters may vary, and that the SL DRX configuration may also include various additional parameters.

It is noted that concepts as illustrated herein can be used by applying all the above parameters and timers defined of the SL DRX configuration or applying only a subset of them. For example, in some cases only a subset of all the parameters or timers may be configured or enabled. For example, the SL DRX configuration may include parameters or timers related to HARQ but some of them might not be used if HARQ feedback is not utilized or disabled. Similarly, some of the parameters or timers might not be used if a maximum number of transmissions of a data packet is set to one or their usage might be limited based on a configured maximum number of retransmissions. For example, for a data packet a certain timer could be reset only K times, where K is the maximum number of transmissions for that data packet or a (pre-)configured maximum number of transmissions, e.g., (pre-)configured per SL resource pool. Similarly, some parameters or timers might not be in use if the SL transmission does not have associated SL HARQ feedback or if the grant or SL resource pool does not include resources for transmission of SL HARQ feedback.

A sensing-based resource allocation utilized in illustrated concepts can be based on the following principles, which are compatible with the sensing based resource allocation as for example specified of the NR technology and may include the following sub-processes:

a) The UE senses the transmission medium in the sensing window, which corresponds to a time interval [n−a, n−b], where n is a time reference depending on the current time, and a>b≥0 define the length, i.e., duration, of the sensing window.

b) Based on the sensing results, the UE predicts the future utilization of the transmission medium in the selection window corresponding to a future time interval [n+T1, n+T2], where T2>T1≥0.

c) The UE selects one or more time-frequency resources among the resources in the selection window that, based on the sensing results, are predicted to be selectable, e.g., idle or otherwise available.

Figure 4:
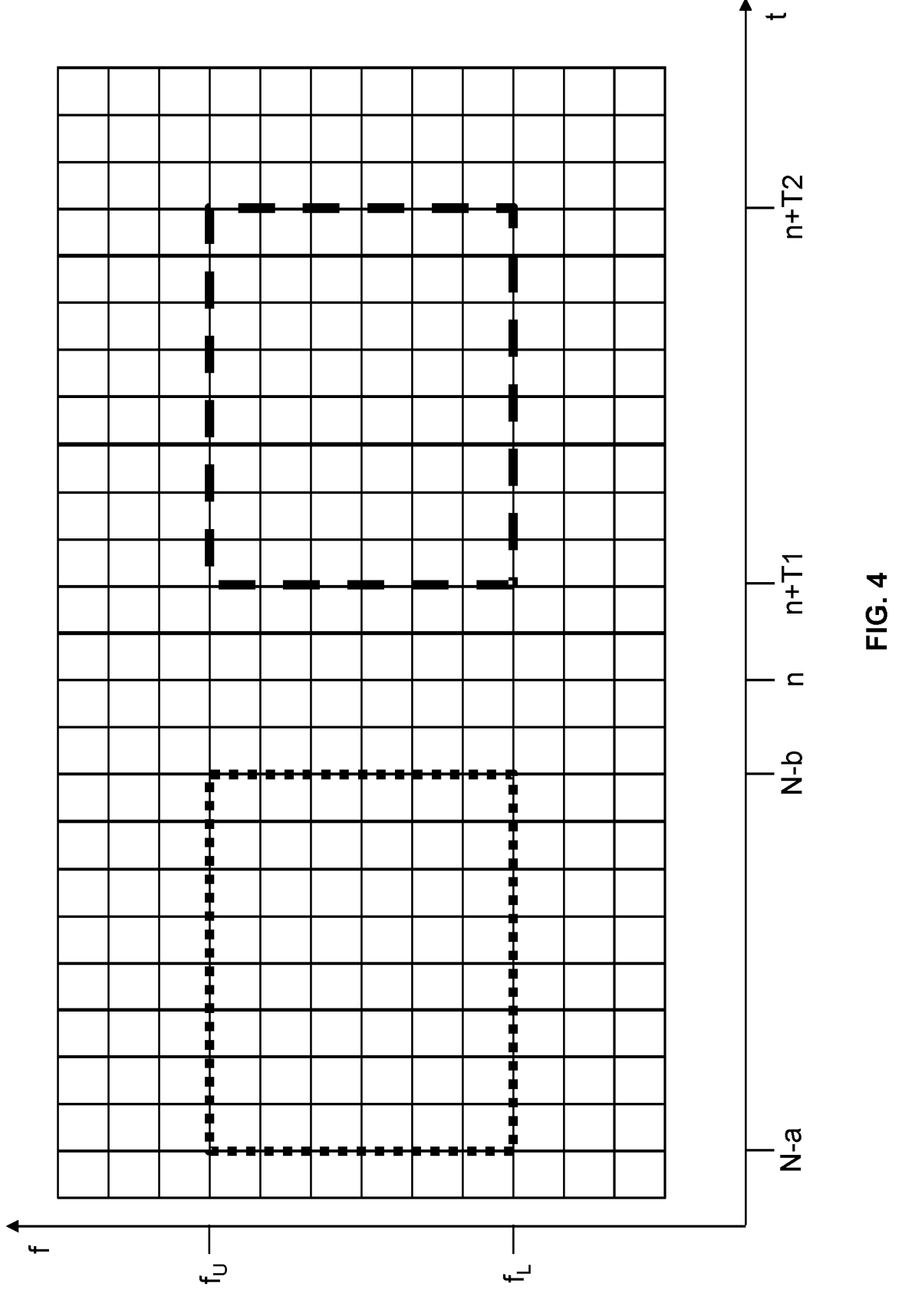
FIG. 4 schematically illustrates a selection window and a sensing window which may be used in a resource selection processes according to an embodiment.

FIG. 4 schematically illustrates the sensing window and the selection window in a time-frequency grid of radio resources. Here, it is noted that along the time coordinate t, the radio resources may be organized in symbols, slots, frames, and/or subframes. Along the frequency coordinate f, the radio resources may be organized in subcarriers, resource elements, resource blocks, sub-channels, bandwidth parts, and/or bands. The grid elements illustrated in FIG. 4 may for example each correspond to one slot along the time coordinate t and one resource element along the frequency coordinate f. In FIG. 4, the sensing window is illustrated by a box with dotted outline, and the selection window is illustrated by a box with dashed outline. In the illustrated example, the sensing window has time boundaries defined by the parameters a and b and the selection window has time boundaries defined by the parameters T1 and T2. Further, the selection window and the sensing window each have a width extending between a lower frequency boundary $f_L$ and an upper frequency boundary $f_U$, i.e., the selection window and the sensing window cover the same frequency resources. It is however noted that it would also be possible that the selection window and the sensing window differ with respect to the covered frequency sources. For example, the selection window could have a lower frequency boundary $f_{L1}$ and an upper frequency boundary $f_{U1}$, while the sensing window has a lower frequency boundary $f_{L2}$ and an upper frequency boundary $f_{U2}$, with $f_{L2}$ being different from $f_{L1}$ or $f_{U2}$ being different from $f_{U1}$. Further, it is noted that in some scenarios the selection window and/or the sensing window could have non-rectangular form or be non-contiguous. For example, the selection window or sensing window could consist of non-consecutive time slots.

In the following, the terms "normal sensing" and "partial sensing" may be used to distinguish resource selection procedures which use a partial window, e.g., partial sensing window and/or partial selection window, from other resource selection procedures refers to sensing using procedures based on a normal size of the sensing window and selection window. Here, the term partial sensing is used to denote the procedures which are based on a partial sensing window and/or partial selection window, and the term normal sensing is used to denote the procedures that are based on a normal size of the sensing window and selection window. Further, it is noted that the partial sensing may also include the case that the size of the partial sensing window is zero, i.e., that the resource selection procedure does not use sensing of the resources to predict their utilization in the selection window. In some cases, the normal sensing window can consist of consecutive time slots, while the partial sensing window consists of non consecutive slots which are distributed over the normal sensing window.

As used herein, the term "selection" may refer to both an initial selection and a re-selection of resources. In some cases, where a distinction of a re-selection and other types of selection is intended, this may be explicitly indicated by using the term "re-selection".

For the sake of simplicity, the following explanations also use the terms "deterministic active time" and "conditional active time". The term "deterministic active time" is used to designate DRX active times of which are due to timers that are activated at predefined time instants, in particular triggered in a periodic manner. The deterministic active times may for example correspond to DRX active times caused by the above-mentioned drx-onDurationTimerSL of a long DRX cycle or a short DRX cycle of an SL DRX configuration. The behavior, in particular the time slots or symbols where the timer starts and expires, of such timer is rather well-defined. For example, the timing may be described by a formula which depends on parameters like a DRX cycle period, defining how frequently the UE switches to the DRX active state, and an active time duration, defining for how long the UE is to remain in the DRX active state. Although some control signalling, e.g., such as a DRX command MAC CE or the Long DRX command MAC CE, can be used to switch between the short and the long DRX cycles, for a UE with configured DRX at least one of the DRX cycles will be running and the timing of the corresponding drx-onDurationTimerSL will follow the configured behavior.

As compared to that, the term "conditional active time" is used to designate to active times which are due to timers that are only activated under a certain outcome of a preceding event, i.e., are event triggered. For example, a timer resulting in a conditional active time could be triggered by an incoming transmission, by an outgoing transmission, by an expected retransmission, or the like. As a result, it may happen that in certain situations the timer is activated, while in other situations the timer is not activated. The behavior related to the timer is thus less predictable than for a periodically triggered timer. Examples of a timer resulting in a conditional active time are the above-mentioned drx-RetransmissionTimerSL and the drx-InactivityTimerSL.

In some scenarios, the illustrated concepts involve that a resource selection procedure considers a DRX state of one or more potential RX UEs, in particular when a potential RX UE is in the DRX active state, and/or a DRX state of the TX UE, in particular when the TX UE is in the DRX active state. For a Mode 2 resource selection process, involving sensing-based resource selection by the TX UE, an example of a corresponding procedure may include the following steps:

Step 1: A resource selection process for an SL transmission is triggered in the UE, e.g., by data arriving at an SL transmit buffer of the UE.

Step 2: The UE performs resource sensing in a configured or pre-configured sensing window to estimate an expected occupation status of radio resources of a resource pool for SL transmissions.

Step 2a: As part of step 2, the resources on which the sensing is performed may be determined based on the TX UE DRX state, depending on when the TX UE is in the DRX active state.

Step 3: The TX UE performs resource selection based on the outcome of the sensing performed at step 2.

Step 3a: As part of step 3, the TX UE may determine a candidate set of resources for the SL transmissions based on the DRX state of the RX UE, in particular based on when the RX UE is in the DRX active state. The resources for the SL transmission may then be selected from the candidate set of resources, taking into account the estimated occupation status from step 2.

Step 4: Shortly before the SL transmission, the UE performs resource re-evaluation to detect potential changes of the estimated occupation status of the radio resources. If the re-evaluation indicates that a re-selection is required, the procedure returns to step 3.

Step 4a: As part of step 4, the UE may adapt its own DRX behavior to facilitate the re evaluation, e.g., by triggering switching to the DRX active state or remaining in the DRX active state for an extended time.

As can be seen, the overall procedure is aligned with the Mode 2 resource selection process of the LTE and NR technology and includes modifications in the form of steps 2a, 3a, and 4a. In some scenarios, only some of these modifications could be applied. For example, the procedure could include the modification of step 2a, but not of steps 3a and 4a. Further, the procedure could include the modification of step 3a, but not of steps 2a and 4a. Further, the procedure could include the modification of step 4a, but not of steps 2a and 3a.

Step 2a may involve that the TX UE senses resource(s) to perform resource selection for transmission(s) to the RX UE based on a set of resources for sensing. The set of resources for sensing may consist of the resources belonging to both the TX UE's sensing window and the TX UE's deterministic active times. Further, the set of resources for sensing may include resources belonging to one or conditional active times of the TX UE. For determining the set of resources for sensing, the TX UE may then consider whether its DRX active state is or will be triggered by an event like an incoming transmission at the TX UE, an outgoing transmission from the TX UE, an expected retransmission to the TX UE, or the like.

The above functionalities described in connection with step 2a enable the TX UE to improve accuracy of the estimation of the expected occupation status. As a result, an improved the data rate and/or reliability of communication can be achieved.

Step 3a may involve that the TX UE selects resource(s) for transmission(s) to the RX UE based on a set of resources for selection. The set of resources for selection may consist of the resources belonging to both the TX UE's selection window and the RX UE's deterministic active times. The TX UE may determines the deterministic active times based on determining that the RX UE receives control signaling from the TX UE or from another entity such as a network node. For example, such control signaling may include a DRX command MAC CE or a Long DRX command MAC CE or a Wakeup signal or a wake up channel. In some scenarios, such control signal may indicates that the RX UE needs to switch to a different DRX cycle, e.g., DRX cycle having a more frequent DRX active time, a DRX cycle having a less frequent DRX active time, a DRX cycle having a longer DRX active time, or a DRX cycle having a shorter DRX active time. For this purpose, the TX UE can include the resources corresponding to in the time slots while the drx-onDurationTimerSL or similar timer is running according to the new DRX cycle in the set of resources for selection, provided that these resources fall within the TX UE's selection window. If the control signaling indicates that the RX UE needs to wake up from sleep state, the RX UE starts the drx-onDurationTimerSL or similar timer, and the TX UE includes the resources corresponding to the time slots while this timer is running in the set of resources for selection, provided that these resources fall within the TX UE's selection window.

Further, the set of resources for selection may include resources belonging to one or conditional active times of the TX UE. For determining the set of resources for selection, the TX UE may then consider whether the RX UE's DRX active state is or will be triggered by an event like an incoming transmission at the RX UE, an outgoing transmission from the RX UE, an expected retransmission to the RX UE, or the like.

In some cases, the TX UE may determine the RX UE's DRX state, in particular when it is in the DRX active state, in response to expected or planned transmission(s) from the TX UE to the RX UE. In some cases, the TX UE may determine a conditional active time of the RX UE based on sending of a scheduling assignment (SA) from the TX UE to the RX UE. The SA may indicate radio resources to be used for a new SL transmission from the TX UE to the RX UE, and may trigger a timer associated with an conditional active time of the RX UE, e.g., to ensure that the RX UE is in the DRX active state when required for one or more potential retransmissions of the SL transmission. The TX UE may then include the resources corresponding to the time slots while this timer is running in the set of resources for selection when selecting resources for the retransmission or when selecting resources for a further new SL transmission. An example of such timer is the above-mentioned drx-RetransmissionTimerSL.

In some cases, the TX UE may determine the RX UE's DRX state, in particular when it is in the DRX active state, in response to failure of an SL transmission from the TX UE to the RX UE. In particular, the RX UE may fail to decode the SL transmission and send feedback to the TX UE to indicate the failure. Further, this event may trigger a timer associated with an conditional active time of the RX UE, e.g., to ensure that the RX UE is in the DRX active state when required for one or more potential retransmissions of the SL transmission. In response, the TX UE may include the resources contained in the slots corresponding to this timer in the set of resources for selection when selecting resources for the retransmission(s) or when selecting resources for a further new SL transmission. An example of such timer is the above-mentioned drx-RetransmissionTimerSL.

In some cases, the TX UE may use the set of resources for selection determined based on the conditional active times when performing a re-selection of resources for the retransmission(s) of the initial SL transmission. The re-selection may be due to a pre-emption or a re-evaluation. In some cases, the set of resources for selection when selecting the resources for the initial SL transmission may be based on only the deterministic active times of the RX UE, while the set of resources for selection when re-selecting the resources for the retransmission(s) may also include one or more conditional active times.

In some cases, the TX UE may consider if the RX UE has recently sent a scheduling request (SR), e.g., on the PUCCH (Physical Uplink Control Channel) or on the RACH (Random Access Channel), which is still pending. For example, the RX UE may inform the TX UE about such pending SR, and the TX UE may consider this information when determining the RX UE's DRX state, in particular when it is in the DRX active state. For example, the TX UE may determine that the RX UE will be in the DRX active state until the SR is cancelled. In some cases, the TX UE may assume that the RX UE remains in the DRX active state for a configured time period, e.g., while a corresponding timer is running. In response, the TX UE may include the resources corresponding to the time slots of the conditional active period of the RX UE in the set of resources for selection, provided that these resources fall within the TX UE's selection window.

The above functionalities described in connection with step 3a enable the TX UE to widen its basis of resources for the selection. As a result, an improved the data rate and/or reliability of communication can be achieved.

Step 4a may involve that, when a resource selection for one or more SL transmissions is triggered while the TX UE it is in the DRX inactive state, the TX UE switches to the DRX active state or that when the resource selection is triggered while the TX UE already is in the DRX inactive state the TX UE prolongs its current active time. In each case, the TX UE may remain in the DRX active state until shortly before performing the intended SL transmission(s) to the RX UE. In this way, the TX UE may be enabled to continue estimating the occupation status of the resources by sensing and update its resource selection, e.g., via re-evaluation or re-selection. As a result, a risk of collisions may be further reduced.

Figure 5:
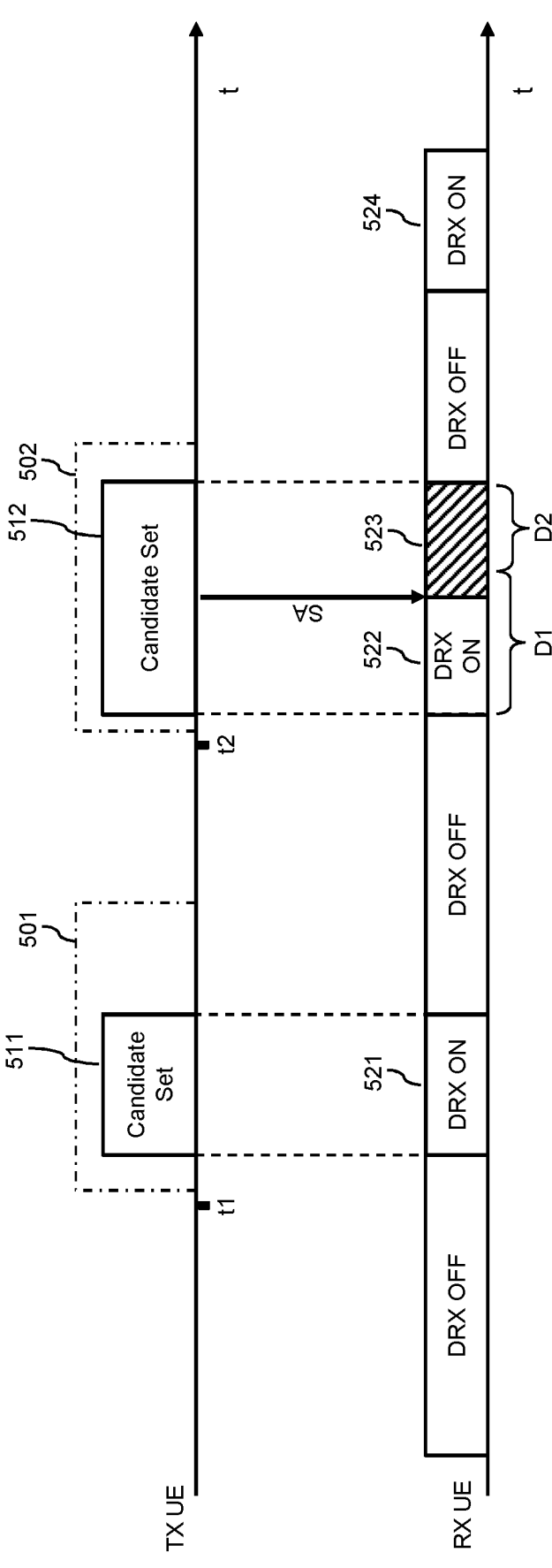
FIG. 5 schematically illustrates an example of a resource selection process according to an embodiment.
Figure 6:
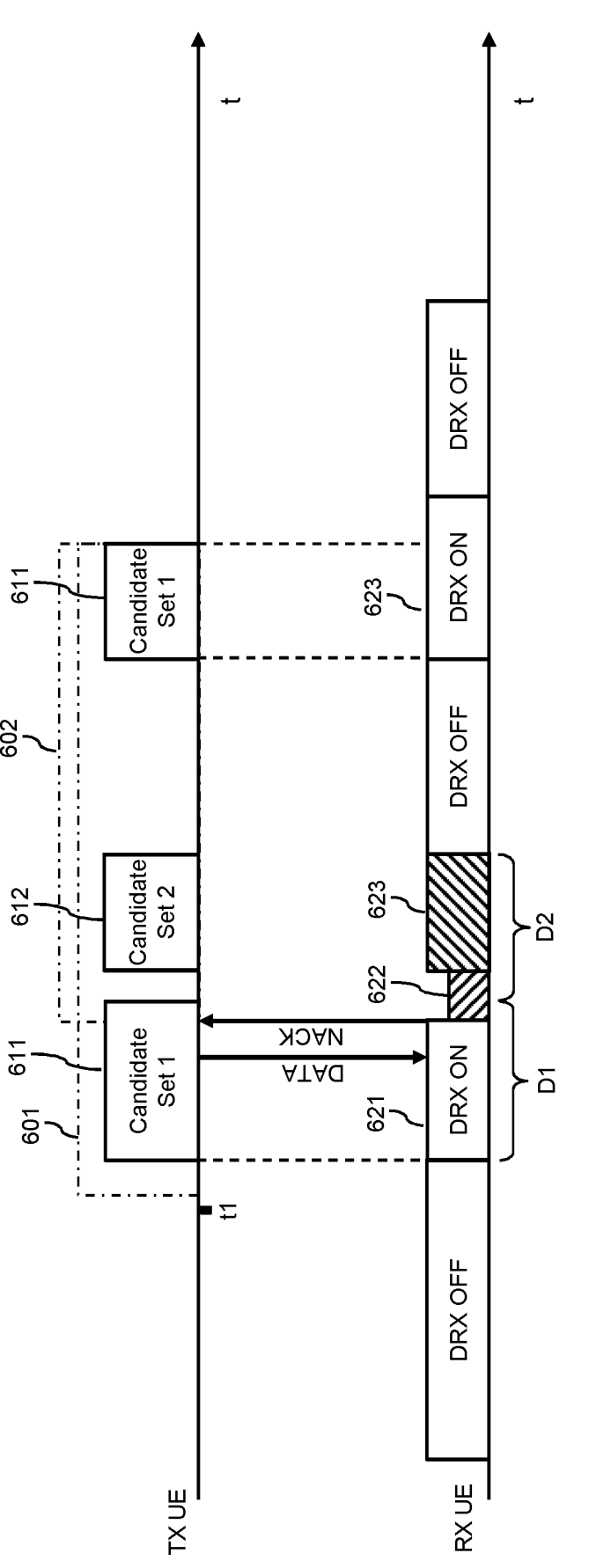
FIG. 6 schematically illustrates a further example of a resource selection process according to an embodiment.

FIGS. 5 and 6 show examples to further illustrate the above-described functionalities related to step 3a. These examples are based on the following assumptions:

Each time the TX UE sends an SL transmission with payload data to the RX UE, the associated SA will trigger, i.e., start or restart, a timer in the RX UE which extends the DRX active time of the UE so that the UE remains in the DRX active state while the timer is running so that the RX UE can receive the SL transmission. This timer may correspond to the above-mentioned drx-InactivityTimerSL.

Upon receiving an SL transmission with payload data from the TX UE, the RX UE sends an acknowledgement message, e.g. in the form of HARQ feedback, to the TX UE and triggers a first timer which allows the RX UE to go into the DRX inactive state. The first timer may correspond to the above-mentioned drx-HARQ-RTT-TimerSL. When the first timer expires and the SL transmission was not successfully decoded, the RX UE triggers a second timer which causes the RX UE to be in the DRX active state while the second timer is running, thereby enabling the RX UE to receive a retransmission of the packet. The second timer may correspond to the above-mentioned drx-RetransmissionTimerSL.

FIG. 5 shows an example for illustrating a resource selection process taking into account deterministic and conditional active times of the RX UE. In FIG. 5, blocks 521, 522, 524 denoted by "DRX ON" on the time line of the RX UE indicate deterministic active times, and blocks denoted by "DRX OFF" on the time line of the RX UE indicate when the RX UE is in the DRX inactive state. A hatched block 523 on the time line of the RX UE indicates a conditional active time caused by the drx-InactivityTimerSL.

In the example of FIG. 5, a resource selection trigger at the TX UE occurs at time t1. The resource selection trigger may for example correspond to arrival of data in an SL TX buffer of the TX UE. As a result, the TX UE selects resources from a candidate set 511 formed by resources which correspond to the deterministic active time 521 of the RX UE and belong to the selection window 501 of the TX UE, which starts immediately after t1.

In the example of FIG. 5, it is further assumed that the TX UE then needs to send a sequence of multiple SL transmissions to the RX UE, e.g., to convey a group of several packets. Such situation may for example occur for busty data traffic, such as voice traffic. Using SL transmissions for conveying voice traffic is for example considered for public safety use cases. When now assuming that the drx-InactivityTimerSL is not running when the resource selection for the SL transmission of the sequence is triggered at time t2, the TX UE selects resources from a candidate set 512 including resources which correspond to the deterministic active time 522 of the RX UE and belong to the selection window 502 of the TX UE, which starts immediately after t2. Further, the candidate set 512 also includes resources corresponding to the time slots 523 while the drx-InactivityTimerSL is running. In particular, once the resource for transmitting the SL transmission of the sequence is selected, the TX UE can determine when the drx-InactivityTimerSL timer will be triggered at the RX UE due to receiving the SA of the first SL transmission. As a result, the TX UE can count the slots corresponding to the duration of the drx-InactivityTimerSL in the candidate set 512 and use this extended candidate set 512 when selecting resources for sending a retransmissions of the first SL transmission or for sending the subsequent SL transmissions of the sequence. Here, it is noted that the drx-InactivityTimerSL would not extend the candidate set 512 beyond the end time of the selection window 502. In FIG. 5, D1 denotes an original duration of the deterministic active time 522, and D1 denotes the extension due to the conditional active time 523.

FIG. 6 shows a further example for illustrating a resource selection process taking into account deterministic and conditional active times of the RX UE. In FIG. 6, blocks 621, 623 denoted by "DRX ON" on the time line of the RX UE indicate deterministic active times, and blocks denoted by "DRX OFF" on the time line of the RX UE indicate when the RX UE is in the DRX inactive state. A first hatched block 622 on the time line of the RX UE indicates an intermediate time interval corresponding to the drx-HARQ-RTT-TimerSL, and a second hatched block 623 on the time line of the RX UE indicates a conditional active time caused by the drx-RetransmissionTimerSL triggered after expiry of the drx-HARQ-RTT-TimerSL.

In the example of FIG. 6, the TX UE selects resources for an initial HARQ-feedback based SL transmission of payload data when a resource selection process is triggered at time t1. The resource selection process may for example be triggered by arrival of data in an SL TX buffer of the TX UE. The TX UE selects the resources for the initial transmission from a first candidate set 611. The first candidate set 611 includes resources which correspond to the deterministic active times 621, 623 of the RX UE and belong to a first selection window 601 of the TX UE, which starts immediately after t1. The initial SL transmission is illustrated by an arrow denoted by "DATA", and HARQ feedback for the initial SL transmission is illustrated by an arrow denoted by "NACK". Specifically, the example of FIG. 6 assumes that the RX UE fails to decode the initial SL transmission and sends indicates this by a negative acknowledgement (NACK). Upon receiving the NACK, the TX UE proceeds to select resources for the HARQ-feedback based retransmission of the initial SL transmission. In the example of FIG. 6, this happens after the TX UE receives the HARQ feedback of the initial SL transmission. However, it would also be possible that the TX UE performs selection of resources for the HARQ-feedback based retransmission at an earlier point of time, in particular already or before sending the initial SL transmission. In such cases, the TX UE may pre-reserves resources for the retransmission under a conservative assumption that the RX UE will fail to decode the initial SL transmission. In each case, the TX UE can determine from, the received NACK when the drx-HARQ-RTT-TimerSL and the drx-RetransmissionTimerSL will be triggered at the RX UE. Accordingly, for the HARQ-feedback based retransmission, the TX UE selects resources from a second candidate set 612. The second candidate set 612 includes resources which correspond to the conditional active time 623 of the RX UE and belong to a second selection window 602 of the TX UE, which starts when the NACK triggers the resource selection process for the retransmission (or earlier as mentioned above). It is noted that in the example of FIG. 6 the transmission of the NACK causes termination of the ongoing deterministic active time 621, so that in the intermediate time interval corresponding to the drx-HARQ-RTT-TimerSL the RX UE is allowed to go to the DRX inactive state.

In a further example, it is assumed that a trigger for resource selection occurs at a first time instance t1. The resource selection process may for example be triggered by arrival of data in an SL TX buffer of the TX UE. In a first resource selection process, the TX UE may then select resources for a number of n SL transmissions of payload data, e.g., for an initial transmission and one or more retransmissions. In this first resource selection process the TX UE may use a first candidate set of resources which consists of resources which correspond to one or more deterministic active times of the RX UE and belong to the current selection window of the TX UE. For simplicity, n=2 can be assumed, i.e., one initial SL transmission and one retransmission. The selected resource for the initial SL transmission starts at a time instance t2>t1. If it is now assumed that during a resource re-evaluation period, which ends at time t2-T3, the UE detects that the selected resource for the retransmission needs to be re-selected, the TX UE proceeds to re-select resources for the retransmission in a second resource selection process. In this second resource selection process the TX UE may use a second candidate set of resources which includes of resources which correspond to one or more deterministic active times of the RX UE and resources which correspond to one or more conditional active times of the RX UE. These one or more conditional active times may for example be triggered like explained for the conditional active times 523, 623 in the examples of FIGS. 5 and 6. For example, the initial SL transmission by the TX UE could not be correctly decoded by the RX UE, and this may trigger two actions at the RX UE: A) sending a negative acknowledgement, e.g., in the form of a HARQ-NACK, to the TX UE, and B) triggering one or more DRX timers, e.g., the above-mentioned drx-HARQ-RTT-TimerSL and subsequently the above-mentioned drx-Retransmission-TimerSL. Upon receiving the negative acknowledgement, the TX UE is informed about the DRX timer(s) started or to be started by the RX UE.

It is noted, that concepts underlying the above examples can be similarly applied to any other timers which cause the RX UE to be in the DRX active state, e.g., timers related to CSI reporting, such as the above-mentioned drx-CSIReport-TimerSL or the above-mentioned drx-BlindRetransmission-TimerSL.

Figure 7A:
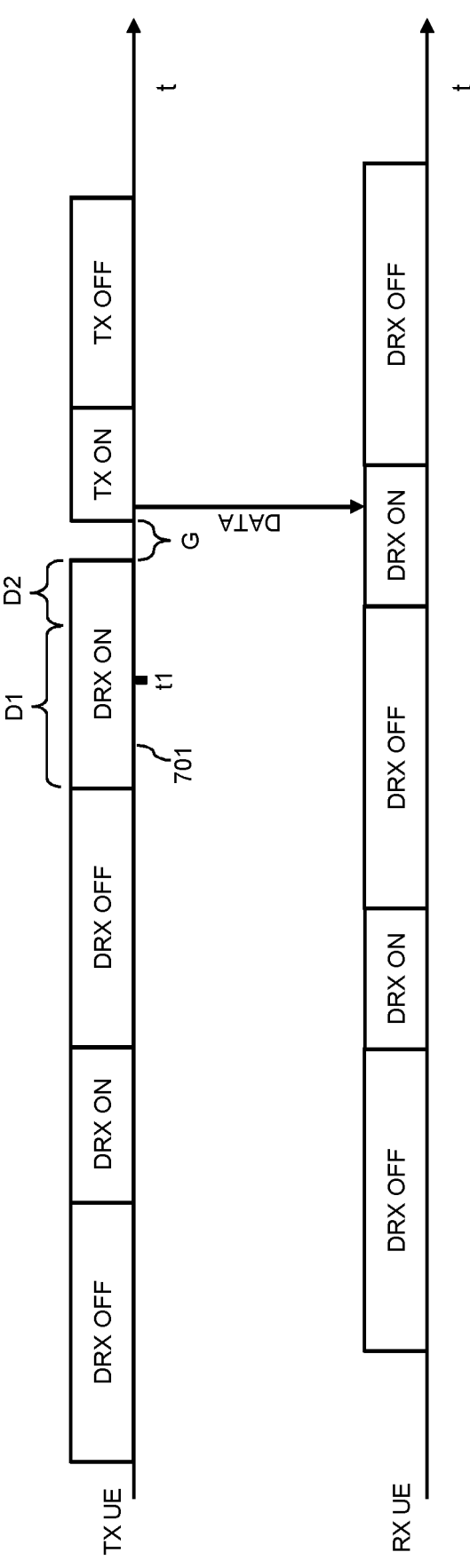
FIG. 7A schematically illustrates a further example of a resource selection process according to an embodiment.
Figure 7B:
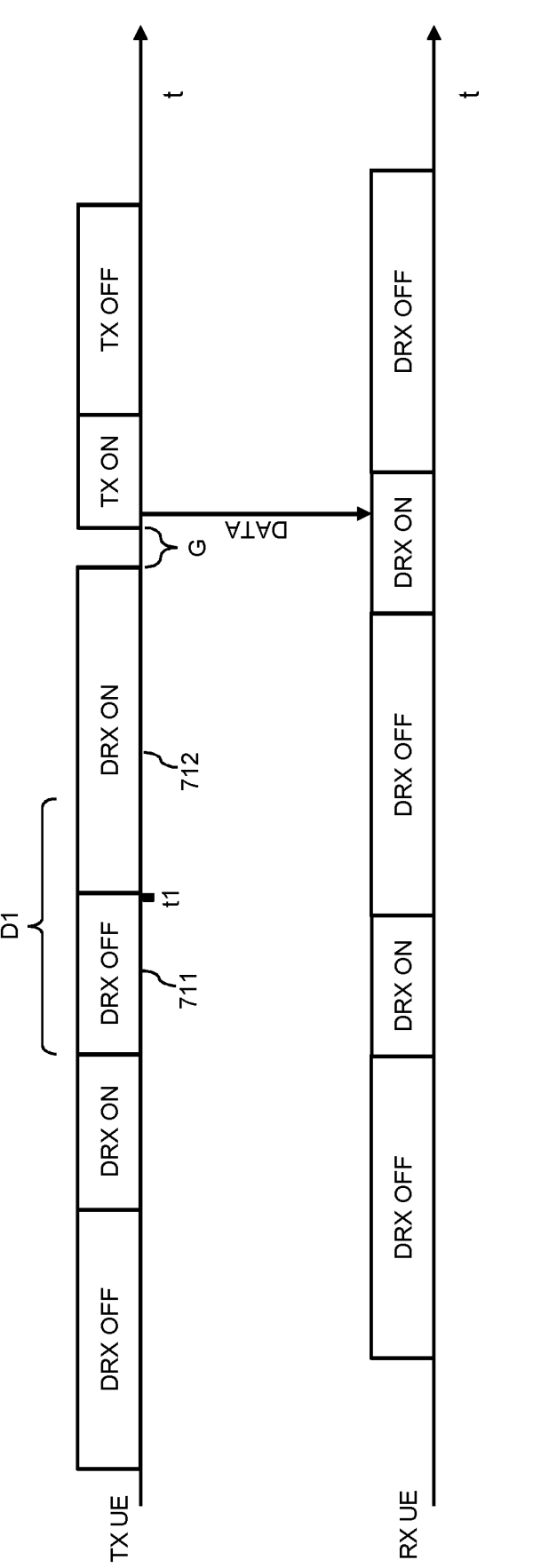
FIG. 7B schematically illustrates a further example of a resource selection process according to an embodiment.
Figure 8:
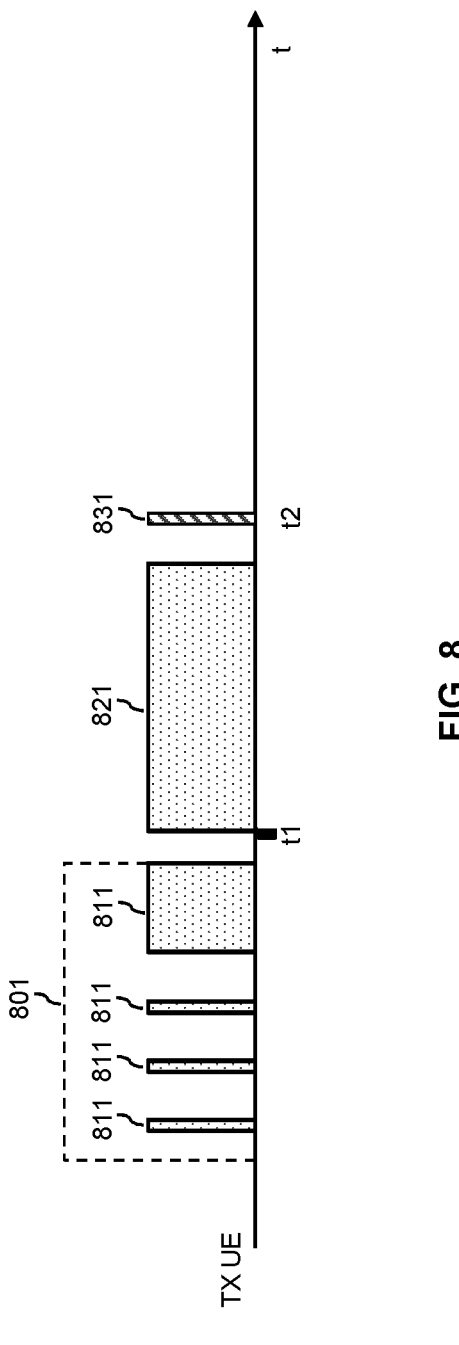
FIG. 8 schematically illustrates a further example of a resource selection process according to an embodiment.

FIGS. 7A, 7B and 8 show an examples to further illustrate the above-described functionalities related to steps 2a and 4a.

In the example of FIG. 7A, the TX UE extends its DRX active time occasion in response to triggering of a resource selection process for an SL transmission. The resource selection process may for example be triggered by arrival of data in an SL TX buffer of the TX UE. In the example of FIG. 7A, it is assumed that both the RX UE and the TX UE are switch between the DRX active state and the DRX inactive state. In each case, DRX active times, in which the UE is in the DRX active state, are illustrated by blocks denoted by "DRX ON", and DRX active times, in which the UE is in the DRX inactive state, are illustrated by blocks denoted by "DRX OFF".

In the example of FIG. 7A the resource selection process is triggered at time t1, which is during the DRX active time 701 of the TX UE. In response to triggering of the resource selection process, the TX UE remains in the DRX active state and prolongs the DRX active time 701 until a time gap G before the TX UE performs the SL transmission, as illustrated by an arrow denoted by "DATA". In FIG. 7A, D1 denotes the original duration of the DRX active time 701, and D2 denotes the duration corresponding to the prolongation of the DRX active time 701.

In the example of FIG. 7B, the TX UE switches to the DRX active state occasion in response to triggering of a resource selection process for an SL transmission. The resource selection process may for example be triggered by arrival of data in an SL TX buffer of the TX UE. In the example of FIG. 7B, it is assumed that both the RX UE and the TX UE are switch between the DRX active state and the DRX inactive state. In each case, DRX active times, in which the UE is in the DRX active state, are illustrated by blocks denoted by "DRX ON", and DRX active times, in which the UE is in the DRX inactive state, are illustrated by blocks denoted by "DRX OFF".

In the example of FIG. 7B the resource selection process is triggered at time t1, which is during the DRX inactive time 711 of the TX UE. In response to triggering of the resource selection process, the TX UE switches to the DRX active state and enters DRX active time 712 which extends until a time gap G before the TX UE performs the SL transmission, as illustrated by an arrow denoted by "DATA". In FIG. 7B, D1 denotes the original duration of the DRX inactive time 711.

In the examples of FIGS. 7A and 7B, the TX UE may use some the DRX active times which occurred before triggering the resource selection process for partial or full sensing of the resources indicated by the TX UE's sensing window. When doing partial sensing before the resource selection process is triggered, the TX UE may switch to full sensing once the resource selection process is triggered and remain in the DRX active state until shortly before the intended SL transmission or for a certain duration. As a result, the TX UE may perform full or continuous sensing on in a monitoring time interval extending between the resource selection trigger and the SL transmission. FIG. 8 illustrates a an example of a corresponding resource selection process.

In the example of FIG. 8, a resource selection trigger, e.g., arrival of data in an SL TX buffer, occurs at time t1. Before time t1, the TX UE performs partial sensing on a subset of resources 811 within a full sensing window 801. Based on the partial sensing, the TX UE performs an initial selection of resources. The resources 831 resulting from the initial selection are assumed to start at t2. After the resource selection trigger at t1, the TX UE remains in the DRX active state for a monitoring time interval 821 and performs sensing on all resources for the purpose of re-evaluation of the initial resource selection. This re-evaluation can result in resource re-selection.

In the above procedures, functionalities related to step 3*a* may include the following variants:

According to some variants, the TX UE performs resource selection for its D2D transmissions based on a candidate set of resources which includes resources belonging to both the TX UE's selection window and one or more active times of the RX UE, in which the RX UE is in an active reception state.

In some sub-variants, the one or more active times includes only deterministic active times of the RX UE, i.e., active times which are triggered in periodic manner.

In some sub-variants, the one or more active times include both deterministic active times and one or more conditional active times of the RX UE.

In some sub-variants, the TX UE can be configured or pre-configured to define which active times, e.g., only deterministic or both deterministic and conditional, or which type of conditional active time, are allowed to be included in the one or more active times. This configuration or pre-configuration may be based on signaling from a node of the wireless communication network, on network operator settings, and/or on manufacturer settings.

In some sub-variants, for an initial resource selection, e.g., triggered by arrival of data at a TX buffer, the one or more active times include only one or more deterministic active times of the RX UE, whereas for a resource re-selection, e.g., for a retransmission, the one or more active times include both one or more deterministic active times and one or more conditional active times.

In some sub-variants, the resource re-selection is triggered by resource re-evaluation and/or by resource preemption.

In some sub-variants, the TX UE determines the RX UE's behavior in response to transmissions from the TX UE in one or more deterministic active times and used this information as a basis to determine which conditional active time is to be included in the one or more active times.

In some sub-variants, a conditional active time could be included in the one or more active times in response to the TX UE determining that the associated timer will be triggered by the reception of an SA or SCI from the TX UE in a preceding deterministic active time. Further, a conditional active time could not be included in the one or more active times in response to the TX UE determining that the associated timer will be not triggered by the reception of an SA or SCI from the TX UE in a preceding deterministic active time. In some sub-variants, the corresponding determination at the TX UE whether to include a certain conditional DRX active time can be done based on the TX UE's transmission. For example, a conditional active time could be included in response to being caused by an initial D2D transmission, but not if it is caused by a retransmission of an earlier D2D transmission. In some sub-variants, the corresponding determination at the TX UE whether to include a certain conditional DRX active time can be done based on channel conditions and/or priority of D2D transmissions.

In some sub-variants, a certain conditional active time can be included in the one or more active times in response to the TX UE determining that the associated timer will be triggered if the RX UE fails to decode the data packet in a preceding active time. For example, whether to include a certain conditional DRX active time can be based on feedback, in particular a NACK, from the RX UE. The feedback may for example correspond to HARQ feedback from the RX UE.

In some sub-variants, a conditional active time can be included in the one or more active times in response to the TX UE determining that the RX UE has recently sent an SR, e.g., on the PUCCH or on the RACH, and the SR is still pending. In some sub-variants, the included conditional active time may be stopped in response to the TX UE determining that the RX UE has cancelled the SR. In some sub-variants, the included active time may be stopped in response to expiry of a timer.

In some sub-variants, the determination at the TX UE whether to include a certain conditional DRX active time can also be based on a combination of two or more of the above-mentioned criteria.

In some sub-variants, the TX UE includes a deterministic active time in the one or more active times in response to the TX UE determining that the associated timer is activated at the RX UE due to the RX UE receiving a control message from the TX UE or from another node, such as a network node. For example, the control message may be a DRX Command MAC CE or a Long DRX Command MAC CE or a Wakeup signal or a Wakeup channel.

In some sub-variants, an included conditional active time is used for selecting resources for the transmission of a new data packet or transport block.

In some sub-variants, an included conditional active time is used for selecting resources for the retransmission(s) of the same data packet or transport block.

In some sub-variants, an included conditional active time is used for selecting resources for both the retransmission(s) of the same data packet and the initial transmission of a data packet.

In some sub-variants, an included conditional active time may be based on a timer corresponding to the above-mentioned the drx-InactivityTimerSL.

In some sub-variants, an included conditional active time may be based on a timer corresponding to the above-mentioned drx-RetransmissionTimerSL.

In some sub-variants, an included deterministic active time may be based on a timer corresponding to the above-mentioned drx-onDurationTimer for a long DRX cycle and/or for a short DRX cycle.

In some sub-variants, the selection window may be a selection window as defined for Mode 2 resource selection of NR SL communication.

In some sub-variants, the TX UE decides based on a condition whether to include a certain conditional active time in the one or more active times. For example, the conditional active time may be included in the one or more active times if the data packet or transport block for which the resource selection is being performed belongs to a certain QoS (Quality of Service) flow, or has a priority value lower than a certain threshold, or has a remaining packet delay budget smaller than a threshold. Further, the conditional active time may be included in the one or more active times if the congestion level in the wireless communication network is above a certain threshold. In some variants, for each type of conditional active time corresponding conditions or corresponding thresholds in each condition may be applied, and these corresponding conditions or thresholds may differ from each other. Alternatively, it would also be possible to apply the same conditions and same thresholds in each condition for each type of conditional active time. In some sub-variants, the above conditions may be configured by a network node or pre-configured in the TX UE, e.g., based on operator settings, such as provided by a SIM (subscribed identity module), or based on manufacturer settings.

In some sub-variants, in case both one or more deterministic active times and one or more conditional active times are included in the one or more active times, the TX UE may prioritize selecting resources which are available during the deterministic active time(s). The prioritization could be performed on the physical layer when selecting the resources, on a MAC layer, e.g., when generating a sidelink grant, or on both the physical layer and the MAC layer.

In the above procedures, functionalities related to step 4a, i.e., to resource sensing and re evaluation, may include the following variants:

In some variants, when a resource selection process is triggered, the TX UE enters the active reception state and remains in the active reception state until a time gap before a D2D transmission on a selected resource.

In some variants, when a resource selection process is triggered, a current active time where the TX UE is in the active reception state is extended until a time gap before a D2D transmission on a selected resource.

In some variants, the TX UE performs full or continuous sensing in a time window or monitoring time interval which starts at the resource selection trigger and ends at the time selected for transmission or at a time gap before the D2D transmission on a selected resource.

In some variants, a timer is activated at the TX UE when the resource selection is triggered. While the timer is running, the TX UE remains in the active state. In some sub-variants, the timer's duration is configured or preconfigured, e.g., based on signaling from a network node, based on operator settings, such as provided by a SIM, or based on manufacturer settings. In some sub-variants, the timer is stopped at a time gap before the D2D transmission in a selected resource. In some sub-variants, the duration of the timer is determined by the UE such that the UE remains in the active reception state until a time gap before the D2D transmission in a selected resource. In some sub-variants, the timer's duration is chosen according to the priority of the associated D2D transmission. For example, a longer duration may be chosen for transmission of higher priority and a shorter duration may be chosen for transmission of lower priority. In some sub-variants, the timer's duration may be chosen according to the congestion level in the system. For example, for a higher CBR (Channel Busy Ratio) value, a longer duration may be chosen. In some sub-variants, the timer's duration may be chosen based on combination of priority of transmission and congestion in the system, e.g., as indicated by a CBR value.

In some sub-variants, the time gap before the D2D transmission may be based on a switching time of the TX UE from reception mode to transmission mode.

In some variants, if the TX UE reserves resources for periodic transmissions, a timer may be activated at a first time gap before a periodic transmission and last for a certain duration. While the timer is running, the UE remains in the active reception state. In some sub-variants, the first time gap and the timer's duration are configured or preconfigured, e.g., based on signaling from a network node, based on operator settings, such as provided by a SIM, or based on manufacturer settings. In some sub-variants, the duration of the timer is determined by the UE such that the UE remains in the active reception state until a second time gap before the D2D transmission in the reserved resource. In some sub-variants, the first time gap and/or the timer's duration is chosen based on the priority of the associated D2D transmission. For example, with higher priority of the D2D transmission, a longer duration of the timer may be chosen, and with lower priority of the D2D transmission a shorter duration of the timer may be chosen. In some sub-variants, the timer's duration may be chosen according to the congestion level in the system, e.g., as indicated by a CBR value. For example, for a higher congestion level, a longer duration may be chosen. In some sub-variants, the timer's duration may be chosen based on a combination of priority of the D2D transmission and a congestion level in the system, e.g., as indicated by a CBR value.

In some variants, the TX UE may decide based on one or more conditions whether to enter and remain in the active reception state, or whether to prolong the current active time, or whether to start the timer for keeping the TX UE in the active reception state, or whether to perform continuous or full sensing after an initial resource selection or after a resource selection trigger. The one or more conditions may include a condition based on characteristics of the data traffic to be transmitted in the D2D transmission. For example, the TX UE may decide to enter and remain in active reception state, or to extend the current active time, or to start the timer if the data traffic has a priority value which is lower than a threshold or if the data traffic has a priority value which is higher than a threshold. In some sub-variants, the one or more conditions may be configured pre-configured at the TX UE, e.g., based on signaling from a network node, based on operator settings, such as provided by a SIM, or based on manufacturer settings.

It is to be noted that the above concepts may be applied to D2D transmissions to a single RX UE, e.g., to unicast SL transmissions, or to D2D transmissions to a group of multiple RX UEs, e.g., to groupcast SL transmissions or to broadcast SL transmissions.

In the case of a groupcast D2D transmission or groupcast SL transmission to a group of RX UEs, the TX UE may determine the candidate set of resources based on considering the active reception times of the group of RX UEs, e.g., by determining the candidate set to correspond to time intervals during which at least a certain percentage X of the group is in the active reception state. The percentage X may be configured by signaling from the wireless communication network.

In case of a broadcast D2D transmission or broadcast SL transmission, the TX UE may determine the candidate set of resources based on considering the active reception times of RX UEs within a certain range Y from the TX UE, e.g., by determining the candidate set to correspond to time intervals during which at least a certain percentage Z of RX UEs within the range is in the active reception state. The range and/or the percentage Z may be configured by signaling from the wireless communication network. The range associated with the Sidelink transmission may be also configured by the gNB. Alternatively or in addition, the range may be determined based on QoS requirements of services or traffic types associated with the broadcast D2D transmission or broadcast SL transmission.

Figure 9:
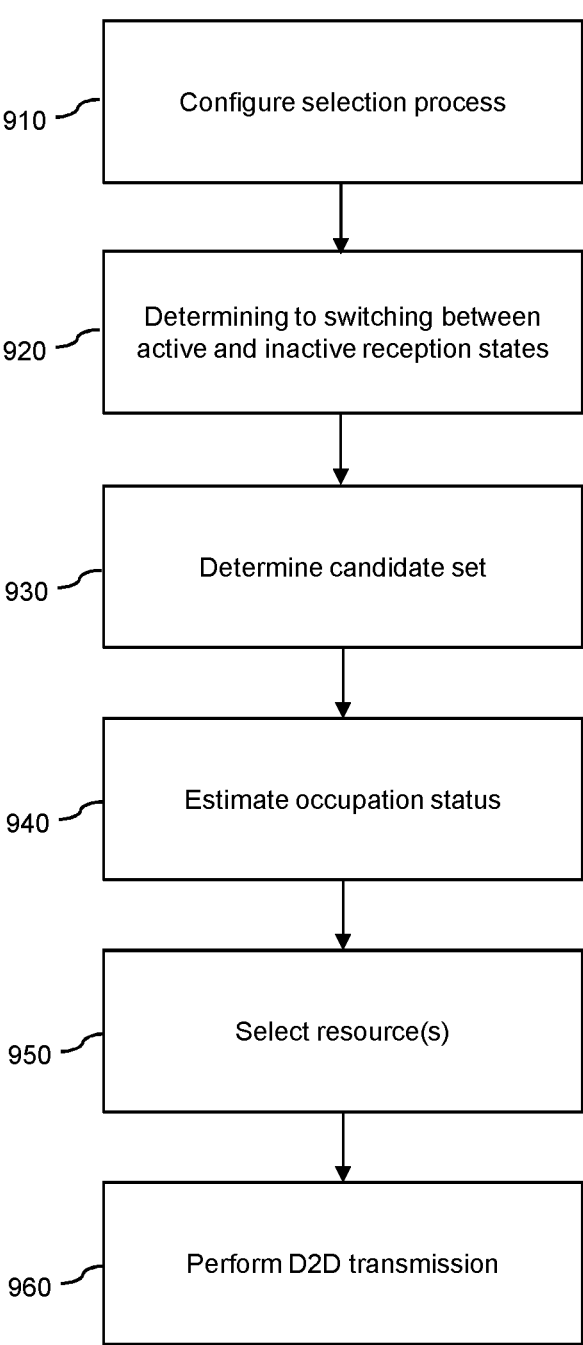
FIG. 9 shows a flowchart for schematically illustrating a method according to an embodiment.

FIG. 9 shows a flowchart for illustrating a method, which may be utilized for implementing the illustrated concepts. The method of FIG. 9 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well. The wireless communication device may for example be a UE for public safety operations, a UE that is mounted on a vehicle or is part of a vehicle. Such vehicle may be a car, a motorcycle, a drone, a bike, or the like.

If a processor-based implementation of the wireless communication device is used, at least some of the steps of the method of FIG. 9 may be performed and/or controlled by one or more processors of the wireless communication device. Such wireless communication device may also include a memory storing program code for implementing at least some of the below described functionalities or steps of the method of FIG. 9.

At step 910, the wireless communication device may configure a selection process. For example, the wireless communication device may configure the selection process with respect to active reception times to be considered in the selection process. The active reception times may be deterministic or conditional active times of DRX. However, the active reception times could also be active reception times of a UE power saving mode, or the like.

At step 920, the wireless communication device determines that a further wireless communication device is configured to switch between an inactive reception state and an active reception state, e.g., that the further wireless communication device is configured with DRX and thus is configured to switch between a DRX inactive state and an DRX active state.

At step 930, the wireless communication device determines a candidate set of radio resources. This is accomplished based on when the further wireless communication device will be in the active reception state.

In some scenarios, the wireless communication device may determine based on control signaling to the further wireless communication device when the further wireless communication device will be in the active reception state. The control signaling may for example include control signaling from the wireless communication device. Alternatively or in addition the control signaling may include control signaling from a node of the wireless communication network. In some cases, the control signaling may include control signaling for configuring a duration of a timer for controlling switching of the further wireless communication device between the inactive reception state and the active reception state. In some cases, the control signaling may include control signaling for triggering switching between the inactive reception state and the active reception state.

In some scenarios, the wireless communication device determine based on one or more transmissions to the further wireless communication device when the further wireless communication device will be in the active reception state. The one or more transmissions to the further wireless communication device may include one or more expected D2D transmissions from the wireless communication device to the further wireless communication device. The one or more expected D2D transmissions may for example include a D2D transmission scheduled by an assignment transmitted by the wireless communication device. The wireless communication device may the determine from the assignment when the further wireless communication device will be in the active reception state. Further, the one or more expected D2D transmissions may include a D2D transmission on reserved radio resources. The wireless communication device may then determine from the reserved resources when the further wireless communication device will be in the active reception state. Further, the one or more expected D2D transmissions may include a retransmission of another D2D transmission from the wireless communication device to the further wireless communication device. The retransmission could for example be triggered based on acknowledgement feedback from the further wireless communication device. In that case, the wireless communication device could determine from the acknowledgment feedback when the further wireless communication device will be in the active reception state. In some scenarios, the retransmission could be scheduled based on a reservation of resources before sending the other D2D transmission. In that case, the wireless communication device could determine from the reservation when the further wireless communication device will be in the active reception state.

In some scenarios, the wireless communication device determine based on one or more transmissions to the further wireless communication device when the further wireless communication device will be in the active reception state. The one or more transmissions from the further wireless communication device may for example include an SR. In that case, the wireless communication device could determine that the further wireless communication device will be in the active reception state as long as the SR is pending.

In some scenarios, the candidate set of resources is based on one or more time intervals when the further wireless communication device will be in the active reception state. The one or more time intervals when the further wireless communication device will be in the active reception state may include at least one first time interval in which a periodically triggered first timer causes the further wireless communication device to be in the active reception state, e.g., like the above-mentioned deterministic active times. Further, the one or more time intervals when the further wireless communication device will be in the active reception state may include at least one second time interval in which a second timer triggered by a D2D transmission to the further wireless communication device causes the further wireless communication device to be in the active reception state. Further, the one or more time intervals when the further wireless communication device will be in the active reception state may include at least one third time interval in which a third timer triggered by a transmission from the further wireless communication device causes the further wireless communication device to be in the active reception state. The above-mentioned conditional active times are examples of the at least one second time interval and the at least one third time interval.

In some scenarios, step 930 may involve that depending on whether the D2D transmission from the wireless communication device to the further wireless communication device is a retransmission, the wireless communication device selects the one or more time intervals to include at least one second time interval in which a second timer triggered by a D2D transmission to the further wireless communication device causes the further wireless communication device to be in the active reception state and/or include at least one third time interval in which a third timer triggered by a transmission from the further wireless communication device causes the further wireless communication device to be in the active reception state.

In some scenarios, step 930 may involve that depending on whether the selection of the at least one radio resource is an initial selection or a re-selection, the wireless communication device selects the one or more time intervals to include at least one second time interval in which a second timer triggered by a D2D transmission to the further wireless communication device causes the further wireless communication device to be in the active reception state and/or include at least one third time interval in which a third timer triggered by a transmission from the further wireless communication device causes the further wireless communication device to be in the active reception state.

In some scenarios, step 930 may involve that depending on a priority of the D2D transmission from the wireless communication device to the further wireless communication device, the wireless communication device selects the one or more time intervals to include at least one second time interval in which a second timer triggered by a D2D transmission to the further wireless communication device causes the further wireless communication device to be in the active reception state and/or include at least one third time interval in which a third timer triggered by a transmission from the further wireless communication device causes the further wireless communication device to be in the active reception state.

In some scenarios, step 930 may involve that depending on a delay requirement, e.g., defined in terms of a remaining delay budget, of the D2D transmission from the wireless communication device to the further wireless communication device, the wireless communication device selects the one or more time intervals to include at least one second time interval in which a second timer triggered by a D2D transmission to the further wireless communication device causes the further wireless communication device to be in the active reception state and/or include at least one third time interval in which a third timer triggered by a transmission from the further wireless communication device causes the further wireless communication device to be in the active reception state.

In some scenarios, step 930 may involve that depending on a congestion level of radio resources, e.g., defined in terms of a CBR, the wireless communication device selecting the one or more time intervals to include at least one second time interval in which a second timer triggered by a D2D transmission to the further wireless communication device causes the further wireless communication device to be in the active reception state and/or include at least one third time interval in which a third timer triggered by a transmission from the further wireless communication device causes the further wireless communication device to be in the active reception state.

In some scenarios, step 930 may involve that depending on configuration information provided by the wireless communication network, e.g., as part of step 910, the wireless communication device selects the one or more time intervals to include at least one second time interval in which a second timer triggered by a D2D transmission to the further wireless communication device causes the further wireless communication device to be in the active reception state and/or include at least one third time interval in which a third timer triggered by a transmission from the further wireless communication device causes the further wireless communication device to be in the active reception state.

In some scenarios, step 930 may involve that the wireless communication device selects the candidate set of resources from a selection window indicating radio resources allowed to be used for a D2D transmission by the wireless communication device, e.g., a selection window as explained in connection with FIG. 4.

If the D2D transmission from the wireless communication device to the further wireless communication device is a D2D transmission to a group of further wireless communication devices, step 930 may involve that the wireless communication device determines the candidate set of radio resources based on when at least one of the group of further wireless communication device will be in the active reception state. In some cases, the wireless communication device may determine the candidate set of radio resources based on when at least minimum percentage of the group of further wireless communication device will be in the active reception state.

At step 940, the wireless communication device may estimate an expected occupation status of radio resources of the candidate set. This may involve monitoring radio resources, e.g., radio resources indicated by a sensing window. At least a part of the radio resources monitored by the wireless communication device may be indicated by a sensing window, e.g., a sensing window as explained in connection with FIG. 4. The sensing window may be used for full sensing or for partial sensing.

In some scenarios, the wireless communication device is configured to switch between an inactive reception state and an active reception state. In such scenarios, the wireless communication device may perform the monitoring of the radio resources to estimate the expected occupation status in response to a periodically triggered timer causing the wireless communication device to be in the active reception state, e.g., like explained above for the deterministic active times of the TX UE. Alternatively or in addition, the wireless communication device may perform the monitoring of the radio resources to estimate the expected occupation status in response to a D2D transmission received by the wireless communication device causing the wireless communication device to be in the active reception state, e.g., like explained above for the deterministic active times of the TX UE. Alternatively or in addition, the wireless communication device may perform the monitoring of the radio resources to estimate the expected occupation status in response to a D2D transmission from the wireless communication device causing the wireless communication device to be in the active reception state, e.g., like explained above for the deterministic active times of the TX UE. Alternatively or in addition, the wireless communication device may perform the monitoring of the radio resources to estimate the expected occupation status in response to an expected D2D transmission to the wireless communication device causing the wireless communication device to be in the active reception state, e.g., like explained above for the deterministic active times of the TX UE. Alternatively or in addition, the wireless communication device may perform the monitoring of the radio resources to estimate the expected occupation status in response to an expected retransmission of a D2D transmission to the wireless communication device causing the wireless communication device to be in the active reception state, e.g., like explained above for the deterministic active times of the TX UE.

In some scenarios, if the wireless communication device is configured to switch between an inactive reception state and an active reception state, the switching between the inactive reception state and the active reception state may be controlled based on a need to perform the monitoring of the radio resources to estimate the expected occupation status of radio resources in the candidate set of radio resources. As for example explained above in connection with step 4a, the wireless communication device could enter the active reception state if data arriving in a TX buffer triggers a resource selection process.

In some scenarios, step 940 may involve that, in response to a need to perform resource selection for the D2D transmission from the wireless communication device to the further wireless communication device, the wireless communication device controls the switching of the wireless communication device between the inactive reception state and the active reception state to continuously keep the wireless communication device in the active reception state for a monitoring interval. During the monitoring interval, the wireless communication device may then monitor radio resources to estimate the expected occupation status of radio resources in the candidate set of radio resources. The monitoring interval may have an end time defined by a time gap before the candidate set of radio resources determined at step 930. In some cases, the time gap before the candidate set of radio resources may depend on a time required to switch the wireless communication device from reception mode to transmission mode. In some cases, the time gap before the candidate set of radio resources may be defined by network operator configuration or by pre-configuration of the wireless communication device. In addition or as alternative, a duration of the monitoring interval is defined by network operator configuration or by pre-configuration of the wireless communication device. In some cases, a duration of the monitoring interval may also depends on a priority of the D2D transmission from the wireless communication device to the further wireless communication device and/or on a congestion level of the radio resources.

In some cases, if the D2D transmission from the from the wireless communication device to the further wireless communication device is performed on at least one radio resource reserved for periodic D2D transmissions, the monitoring interval may have a start time defined by a configured time gap before the at least one resource reserved for periodic D2D transmissions. The time gap before the at least one resource reserved for periodic D2D transmissions may be defined by network operator configuration or by pre-configuration of the wireless communication device, e.g., as part of step 910.

In some scenarios, the wireless communication device may select depending on at least one additional condition whether to control the switching of the wireless communication device between the inactive reception state and the active reception state to continuously keep the wireless communication device in the active reception state for the monitoring interval. The at least one additional condition comprises a condition related to a characteristic of data traffic to be conveyed in the D2D transmission from the wireless communication device to the further wireless communication device. In addition or as an alternative, the at least one additional condition may be defined by network operator configuration or by pre-configuration of the wireless communication device, e.g., as part of step 910.

In some scenarios step 940 may involve that the wireless communication device already performed, from the candidate set of radio resources, an initial selection of the at least one radio resource for the D2D transmission from the wireless communication device to the further wireless communication device, based on the monitoring of the radio resources during the monitoring interval, the wireless communication device estimating the expected occupation status in the candidate set of radio resources, and based on the estimated expected occupation status, the wireless communication device performs, from the candidate set of radio resources, a re-selection of the at least one radio resource for the D2D transmission from the wireless communication device to the further wireless communication device.

In some scenarios step 940 may involve that the wireless communication device monitors radio resources to obtain a first estimate of the expected occupation status of the radio resources in the candidate set of radio resources in response to the wireless communication device being caused to be in the active reception state by at least one of: a periodically triggered timer, a D2D transmission received by the wireless communication device, a D2D transmission from the wireless communication device, an expected D2D transmission to the wireless communication device, and an expected retransmission of a D2D transmission to the wireless communication device. Based on the first estimate of the expected occupation status, the wireless communication device may then perform, from the candidate set of radio resources, an initial selection of the at least one radio resource for the D2D transmission from the wireless communication device to the further wireless communication device. Based on the monitoring of the radio resources during the monitoring interval, the wireless communication device may then obtain a second estimate of the expected occupation status in the candidate set of radio resources. Based on the second estimate of the expected occupation status, the wireless communication device may then perform, from the candidate set of radio resources, a re-selection of the at least one radio resource for the D2D transmission from the wireless communication device to the further wireless communication device.

The monitoring interval may then have an end time defined by a time gap before the at least one radio resource selected in the initial selection. The time gap before the at least one radio resource selected in the initial selection may depend on a time required to switch the wireless communication device from reception mode to transmission mode. As an alternative or in addition, the time gap before the at least one radio resource selected in the initial selection may be defined by network operator configuration or by pre-configuration of the wireless communication device, e.g., as part of step 910.

At step 950, the wireless communication device selects at least one radio resource for a D2D transmission from the wireless communication device to the further wireless communication device. The wireless communication device selects the at least one radio resource from the candidate set determined at step 930. Further, the wireless communication device may select the at least one radio resource based on the expected occupation status estimated at step 940.

At step 960, the wireless communication device may perform the D2D transmission on the at least one radio resource selected at step 950. In some scenarios, the D2D transmission from the wireless communication device to the further wireless communication device is a D2D transmission to a group of further wireless communication devices each configured to switch between an inactive reception state and an active reception state. For example, the D2D transmission may be a groupcast transmission or a broadcast transmission.

Figure 10:
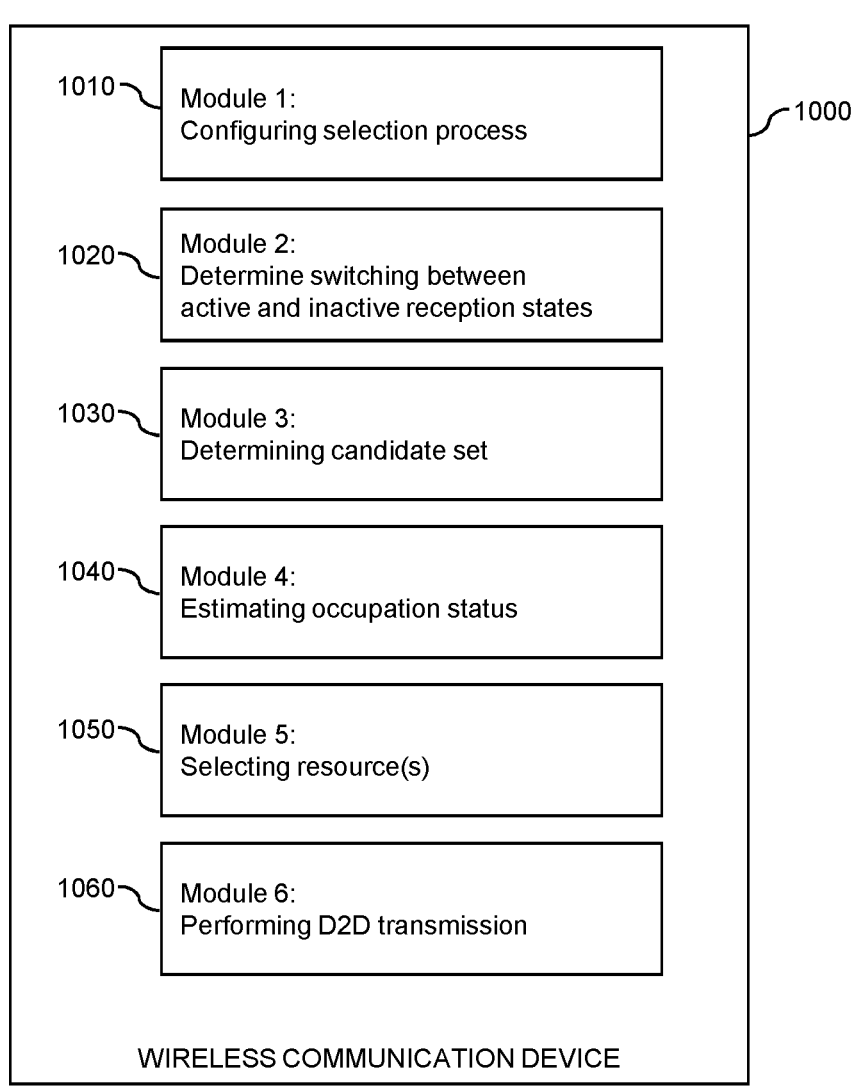
FIG. 10 shows an exemplary block diagram for illustrating functionalities of a wireless communication device implementing functionalities corresponding to the method of FIG. 9.

FIG. 10 shows a block diagram for illustrating functionalities of a wireless communication device 1000 which operates according to the method of FIG. 9. The wireless communication device 1000 may for example correspond to any of the above-mentioned UEs. As illustrated, the wireless communication device 1000 may be provided with a module 1010 configured to configure a selection process, such as explained in connection with step 910. Further, the wireless communication device 1000 device may be provided with a module 1020 configured to determine that further wireless communication device is configured to switch between an inactive reception state and an active reception state, such as explained in connection with step 920. Further, the wireless communication device 1000 may be provided with a module 1030 configured to determine a candidate set of resources, such as explained in connection with step 930. Further, the wireless communication device 1000 may be provided with a module 1040 configured to estimate an occupation status of radio resources, such as explained in connection with step 940. Further, the wireless communication device 1000 may be provided with a module 1050 configured to select at least one radio resource, such as explained in connection with step 950. Further, the wireless communication device 1000 may be provided with a module 1060 configured to perform a D2D transmission, such as explained in connection with step 960.

It is noted that the wireless communication device 1000 may include further modules for implementing other functionalities, such as known functionalities of a UE in the LTE and/or NR radio technology. Further, it is noted that the modules of the wireless communication device 1000 do not necessarily represent a hardware structure of the wireless communication device 1000, but may also correspond to functional elements, e.g., implemented by hardware, software, or a combination thereof.

Figure 11:
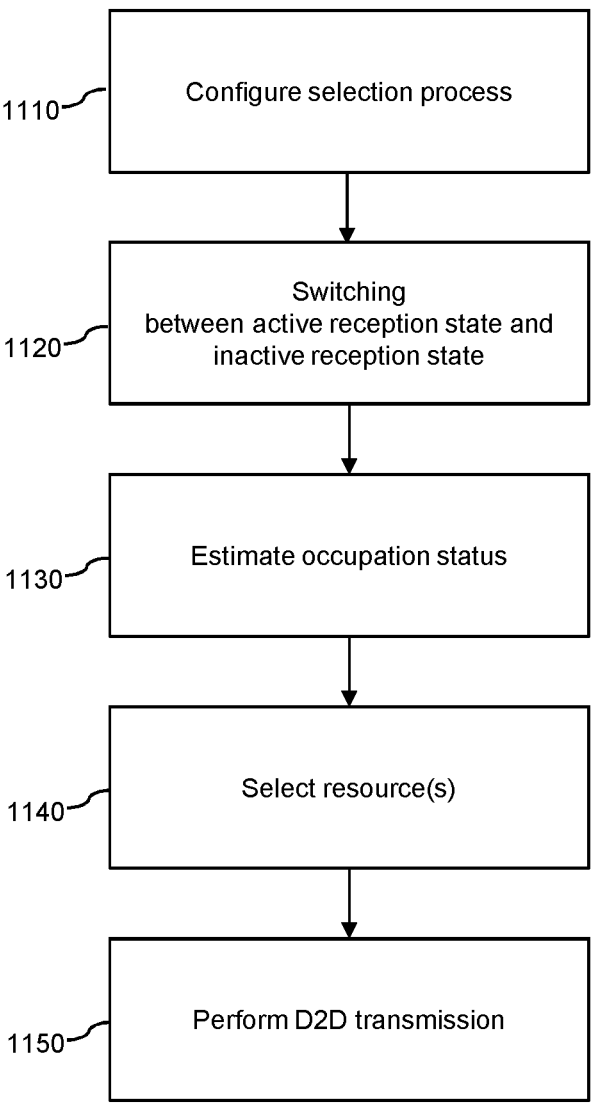
FIG. 11 shows a flowchart for schematically illustrating a further method according to an embodiment.

FIG. 11 shows a flowchart for illustrating a method, which may be utilized for implementing the illustrated concepts. The method of FIG. 11 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well. The wireless communication device may for example be a UE for public safety operations, a UE that is mounted on a vehicle or is part of a vehicle. Such vehicle may be a car, a motorcycle, a drone, a bike, or the like.

If a processor-based implementation of the wireless communication device is used, at least some of the steps of the method of FIG. 11 may be performed and/or controlled by one or more processors of the wireless communication device. Such wireless communication device may also include a memory storing program code for implementing at least some of the below described functionalities or steps of the method of FIG. 11.

At step 1110, the wireless communication device may configure a selection process. For example, the wireless communication device may configure the selection process with respect to active reception times to be considered in the selection process. The active reception times may be deterministic or conditional active times of DRX. However, the active reception times could also be active reception times of a UE power saving mode, or the like.

At step 1120, the wireless communication device switches between an inactive reception state and an active reception state. For example, the wireless communication device may be configured with DRX and switch between a DRX inactive state and an DRX active state.

At step 1140, the wireless communication device may estimate an expected occupation status of radio resources of a candidate set of radio resources. This may involve monitoring radio resources, e.g., radio resources indicated by a sensing window. At least a part of the radio resources monitored by the wireless communication device may be indicated by a sensing window, e.g., a sensing window as explained in connection with FIG. 4. The sensing window may be used for full sensing or for partial sensing.

In some scenarios, the wireless communication device may perform the monitoring of the radio resources to estimate the expected occupation status in response to a periodically triggered timer causing the wireless communication device to be in the active reception state, e.g., like explained above for the deterministic active times of the TX UE. Alternatively or in addition, the wireless communication device may perform the monitoring of the radio resources to estimate the expected occupation status in response to a D2D transmission received by the wireless communication device causing the wireless communication device to be in the active reception state, e.g., like explained above for the deterministic active times of the TX UE. Alternatively or in addition, the wireless communication device may perform the monitoring of the radio resources to estimate the expected occupation status in response to a D2D transmission from the wireless communication device causing the wireless communication device to be in the active reception state, e.g., like explained above for the deterministic active times of the TX UE. Alternatively or in addition, the wireless communication device may perform the monitoring of the radio resources to estimate the expected occupation status in response to an expected D2D transmission to the wireless communication device causing the wireless communication device to be in the active reception state, e.g., like explained above for the deterministic active times of the TX UE. Alternatively or in addition, the wireless communication device may perform the monitoring of the radio resources to estimate the expected occupation status in response to an expected retransmission of a D2D transmission to the wireless communication device causing the wireless communication device to be in the active reception state, e.g., like explained above for the deterministic active times of the TX UE.

In some scenarios, the switching between the inactive reception state and the active reception state of step 1120 may be controlled based on a need to perform the monitoring of the radio resources to estimate the expected occupation status of radio resources in the candidate set of radio resources. As for example explained above in connection with step 4a, the wireless communication device could enter the active reception state if data arriving in a TX buffer triggers a resource selection process.

In some scenarios, step 1130 may involve that, in response to a need to perform resource selection for the D2D transmission from the wireless communication device to the further wireless communication device, the wireless communication device controls the switching of the wireless communication device between the inactive reception state and the active reception state to continuously keep the wireless communication device in the active reception state for a monitoring interval. During the monitoring interval, the wireless communication device may then monitor radio resources to estimate the expected occupation status of radio resources in the candidate set of radio resources. The monitoring interval may have an end time defined by a time gap before the candidate set of radio resources. In some cases, the time gap before the candidate set of radio resources may depend on a time required to switch the wireless communication device from reception mode to transmission mode. In some cases, the time gap before the candidate set of radio resources may be defined by network operator configuration or by pre-configuration of the wireless communication device. In addition or as alternative, a duration of the monitoring interval is defined by network operator configuration or by pre-configuration of the wireless communication device. In some cases, a duration of the monitoring interval may also depends on a priority of the D2D transmission from the wireless communication device to the further wireless communication device and/or on a congestion level of the radio resources.

In some cases, if the D2D transmission from the from the wireless communication device to the further wireless communication device is performed on at least one radio resource reserved for periodic D2D transmissions, the monitoring interval may have a start time defined by a configured time gap before the at least one resource reserved for periodic D2D transmissions. The time gap before the at least one resource reserved for periodic D2D transmissions may be defined by network operator configuration or by pre-configuration of the wireless communication device, e.g., as part of step 1110.

In some scenarios, the wireless communication device may select depending on at least one additional condition whether to control the switching of the wireless communication device between the inactive reception state and the active reception state to continuously keep the wireless communication device in the active reception state for the monitoring interval. The at least one additional condition comprises a condition related to a characteristic of data traffic to be conveyed in the D2D transmission from the wireless communication device to the further wireless communication device. In addition or as an alternative, the at least one additional condition may be defined by network operator configuration or by pre-configuration of the wireless communication device, e.g., as part of step 1110.

In some scenarios step 1130 may involve that the wireless communication device already performed, from the candidate set of radio resources, an initial selection of the at least one radio resource for the D2D transmission from the wireless communication device to the further wireless communication device, based on the monitoring of the radio resources during the monitoring interval, the wireless communication device estimating the expected occupation status in the candidate set of radio resources, and based on the estimated expected occupation status, the wireless communication device performs, from the candidate set of radio resources, a re-selection of the at least one radio resource for the D2D transmission from the wireless communication device to the further wireless communication device.

In some scenarios step 1130 may involve that the wireless communication device monitors radio resources to obtain a first estimate of the expected occupation status of the radio resources in the candidate set of radio resources in response to the wireless communication device being caused to be in the active reception state by at least one of: a periodically triggered timer, a D2D transmission received by the wireless communication device, a D2D transmission from the wireless communication device, an expected D2D transmission to the wireless communication device, and an expected retransmission of a D2D transmission to the wireless communication device. Based on the first estimate of the expected occupation status, the wireless communication device may then perform, from the candidate set of radio resources, an initial selection of the at least one radio resource for the D2D transmission from the wireless communication device to the further wireless communication device. Based on the monitoring of the radio resources during the monitoring interval, the wireless communication device may then obtain a second estimate of the expected occupation status in the candidate set of radio resources. Based on the second estimate of the expected occupation status, the wireless communication device may then perform, from the candidate set of radio resources, a re-selection of the at least one radio resource for the D2D transmission from the wireless communication device to the further wireless communication device.

The monitoring interval may then have an end time defined by a time gap before the at least one radio resource selected in the initial selection. The time gap before the at least one radio resource selected in the initial selection may depend on a time required to switch the wireless communication device from reception mode to transmission mode. As an alternative or in addition, the time gap before the at least one radio resource selected in the initial selection may be defined by network operator configuration or by pre-configuration of the wireless communication device, e.g., as part of step 1110.

At step 1140, the wireless communication device selects at least one radio resource for a D2D transmission from the wireless communication device to the further wireless communication device. The wireless communication device selects the at least one radio resource from the candidate set, based on the expected occupation status estimated at step 1130.

At step 1150, the wireless communication device may perform the D2D transmission on the at least one radio resource selected at step 1140. In some scenarios, the D2D transmission from the wireless communication device to the further wireless communication device is a D2D transmission to a group of further wireless communication devices. For example, the D2D transmission may be a groupcast transmission or a broadcast transmission.

Figure 12:
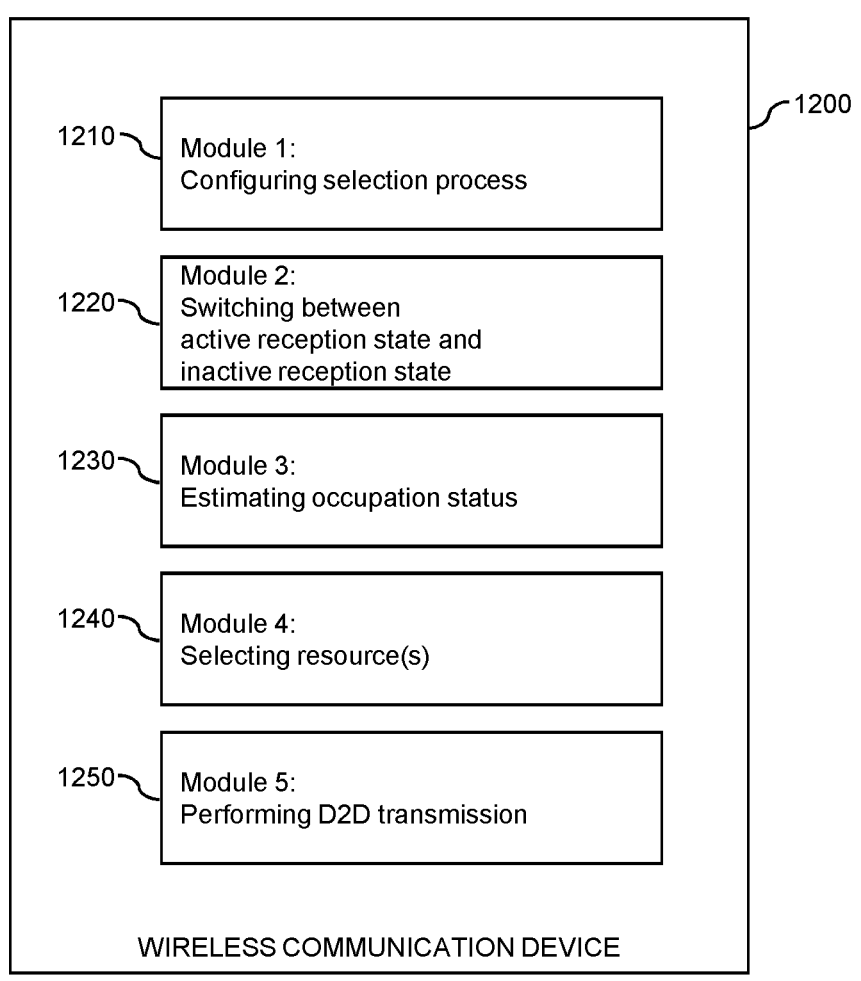
FIG. 12 shows an exemplary block diagram for illustrating functionalities of a wireless communication device implementing functionalities corresponding to the method of FIG. 11.

FIG. 12 shows a block diagram for illustrating functionalities of a wireless communication device 1200 which operates according to the method of FIG. 11. The wireless communication device 1200 may for example correspond to any of the above-mentioned UEs. As illustrated, the wireless communication device 1200 may be provided with a module 1210 configured to configure a selection process, such as explained in connection with step 1110. Further, the wireless communication device 1200 device may be provided with a module 1020 configured to switch between an inactive reception state and an active reception state of the wireless communication device, such as explained in connection with step 1120. Further, the wireless communication device 1200 may be provided with a module 1130 configured to estimate an occupation status of radio resources, such as explained in connection with step 1130. Further, the wireless communication device 1200 may be provided with a module 1240 configured to select at least one radio resource, such as explained in connection with step 1140. Further, the wireless communication device 1200 may be provided with a module

1250 configured to perform a D2D transmission, such as explained in connection with step 1150.

It is noted that the wireless communication device 1200 may include further modules for implementing other functionalities, such as known functionalities of a UE in the LTE and/or NR radio technology. Further, it is noted that the modules of the wireless communication device 1200 do not necessarily represent a hardware structure of the wireless communication device 1200, but may also correspond to functional elements, e.g., implemented by hardware, software, or a combination thereof.

FIG. 13 shows a flowchart for illustrating a method, which may be utilized for implementing the illustrated concepts. The method of FIG. 13 may be used for implementing the illustrated concepts in a node of a wireless communication network, e.g., corresponding to the above-mentioned access node 100. In particular, the method of FIG. 13 may be used to configure a wireless communication device for operation according to the method of FIG. 9 and/or according to the method of FIG. 11.

If a processor-based implementation of the node is used, at least some of the steps of the method of FIG. 13 may be performed and/or controlled by one or more processors of the node. Such node may also include a memory storing program code for implementing at least some of the below described functionalities or steps of the method of FIG. 13.

At step 1310, the node may configure the wireless communication device with respect to determination when a further wireless communication device will be in the active reception state. This may for example involve configuring selection of time intervals as explained in connection with step 930 of FIG. 9.

At step 1320, the node may configure the wireless communication device with respect to consideration when the wireless communication device is in the active reception state. This may for example involve configuration at which times the wireless communication device is to performing the monitoring of resources for estimating the expected occupation status, e.g., by configuring processes as described in connection with step 940 of FIG. 9 or processes as described in connection with step 1130 of FIG. 11.

At step 1330, the node may configure the wireless communication device with respect to controlling switching of the wireless communication device between in the inactive reception state and the active reception state. This may for example involve configuration for controlling the wireless communication device to continuously remain in the active reception state for a monitoring interval as described in connection with step 940 of FIG. 9 or processes as described in connection with step 1130 of FIG. 11.

FIG. 14 shows a block diagram for illustrating functionalities of a network node 1400 which operates according to the method of FIG. 13. The network node 1400 may for example correspond to any of the above-mentioned access node 100. As illustrated, the network node 1400 may be provided with a module 1410 adapted to configure a wireless communication device with respect to determination when a further wireless communication device will be in the active reception state, such as explained in connection with step 1310. Further, the network node 1400 may be provided with a module 1420 adapted to configure a wireless communication device with respect to consideration when the wireless communication device will be in the active reception state, such as explained in connection with step 1320. Further, the network node 1400 may be provided with a module 1430 adapted to configure the wireless communication device with respect to controlling switching of the wireless communication device between in the inactive reception state and the active reception state, such as explained in connection with step 1330.

It is noted that the network node 1400 may include further modules for implementing other functionalities, such as known functionalities of an eNB in the LTE technology and/or of a gNB of the NR technology. Further, it is noted that the modules of the network node 1400 do not necessarily represent a hardware structure of the network node 1400, but may also correspond to functional elements, e.g., implemented by hardware, software, or a combination thereof. It is to be understood that the functionalities as described in connection with FIGS. 9 to 14 may also be combined in various ways, e.g., in a system which includes one or more wireless communication devices operating according to the method of FIG. 9 and one or more wireless communication devices operating according to the method of FIG. 11. Further, the functionalities could be combined in a system which includes one or more wireless communication devices operating according to the method of FIG. 9 or according to the method of FIG. 11, and a node operating according to the method of FIG. 13 which is used to configure at least some at the wireless communication devices.

Figure 15:
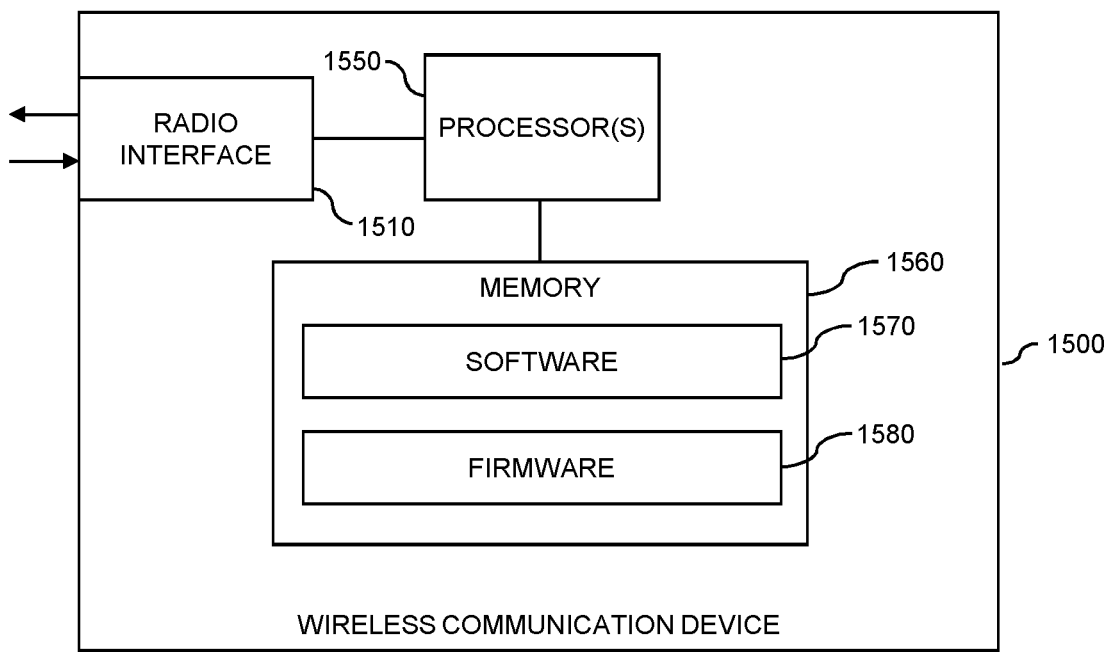
FIG. 15 schematically illustrates structures of a wireless communication device according to an embodiment of the invention.

FIG. 15 illustrates a processor-based implementation of a wireless communication device 1500 which may be used for implementing the above-described concepts. For example, the structures as illustrated in FIG. 15 2 may be used for implementing the concepts in any of the above-mentioned UEs.

As illustrated, the wireless communication device 1500 includes one or more radio interfaces 1510. The radio interface(s) 1510 may for example be based on the NR technology or the LTE technology. The radio interface(s) 1510 may support D2D communication, e.g., using SL communication as specified for the NR technology or the LTE technology.

Further, the wireless communication device 1500 may include one or more processors 1550 coupled to the radio interface(s) 1510 and a memory 1560 coupled to the processor(s) 1550. By way of example, the radio interface(s) 1510, the processor(s) 1550, and the memory 1560 could be coupled by one or more internal bus systems of the wireless communication device 1500. The memory 1560 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1560 may include software 1570 and/or firmware 1580. The memory 1560 may include suitably configured program code to be executed by the processor(s) 1550 so as to implement the above-described functionalities for controlling D2D communication, such as explained in connection with FIGS. 9 to 12.

It is to be understood that the structures as illustrated in FIG. 15 are merely schematic and that the wireless communication device 1500 may actually include further components which, for the sake of clarity, have not been illustrated, e.g., further interfaces, such as a dedicated management interface, or further processors. Also, it is to be understood that the memory 1560 may include further program code for implementing known functionalities of a UE. According to some embodiments, also a computer program may be provided for implementing functionalities of the wireless communication device 1500, e.g., in the form of a physical medium storing the program code and/or other data to be stored in the memory 1560 or by making the program code available for download or by streaming.

Figure 16:
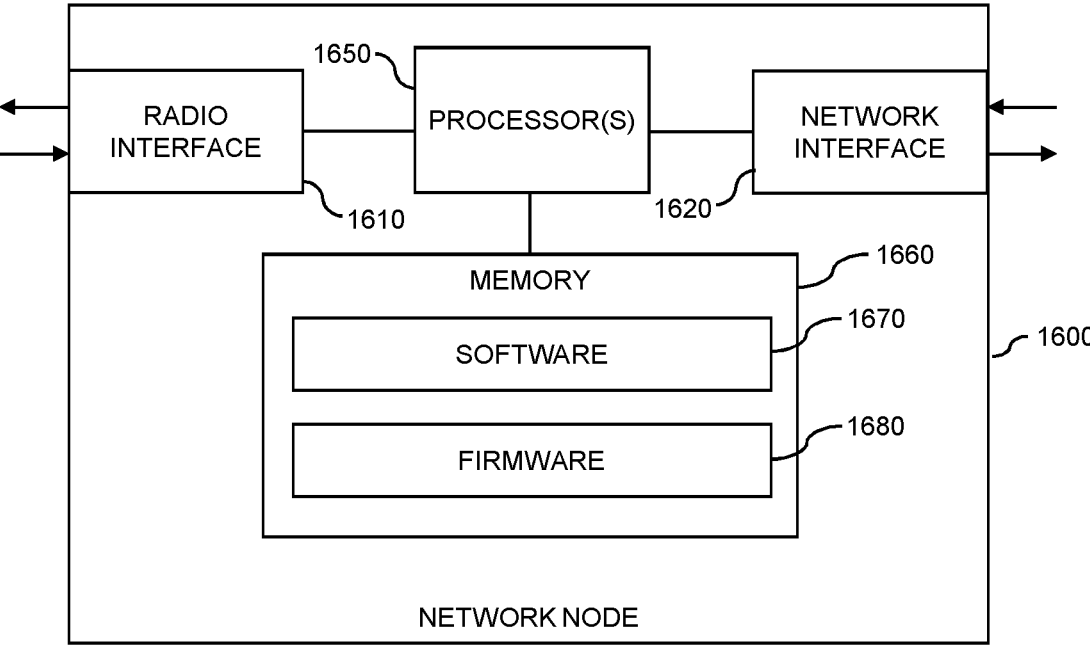
FIG. 16 schematically illustrates structures of a network node according to an embodiment of the invention.

FIG. 16 illustrates a processor-based implementation of a node 1600 for a wireless communication network, which may be used for implementing the above-described concepts. For example, the structures as illustrated in FIG. 16 may be used for implementing the concepts in any of the above-mentioned access nodes.

As illustrated, the node 1600 may include one or more radio interfaces 1610. The radio interface(s) 1610 may for example be based on the NR technology or the LTE technology. The radio interface(s) 1610 may be used for controlling wireless communication devices, such as any of the above-mentioned UEs. In addition, the node 1600 may include one or more network interfaces 1620. The network interface(s) 1620 may for example be used for communication with one or more other nodes of the wireless communication network. Also the network interface(s) 1620 may be used for controlling wireless communication devices, such as any of the above-mentioned UEs.

Further, the node 1600 may include one or more processors 1650 coupled to the interface(s) 1610, 1620 and a memory 1660 coupled to the processor(s) 1650. By way of example, the interface(s) 1610, the processor(s) 1650, and the memory 1660 could be coupled by one or more internal bus systems of the node 1600. The memory 1660 may include a ROM, e.g., a flash ROM, a RAM, e.g., a DRAM or SRAM, a mass storage, e.g., a hard disk or solid state disk, or the like. As illustrated, the memory 1660 may include software 1670 and/or firmware 1680. The memory 1660 may include suitably configured program code to be executed by the processor(s) 1650 so as to implement the above-described functionalities for controlling D2D communication, such as explained in connection with FIGS. 13 and 14.

It is to be understood that the structures as illustrated in FIG. 16 are merely schematic and that the node 1600 may actually include further components which, for the sake of clarity, have not been illustrated, e.g., further interfaces, such as a dedicated management interface, or further processors. Also, it is to be understood that the memory 1660 may include further program code for implementing known functionalities of an eNB or of a gNB. According to some embodiments, also a computer program may be provided for implementing functionalities of the node 1600, e.g., in the form of a physical medium storing the program code and/or other data to be stored in the memory 1660 or by making the program code available for download or by streaming.

As can be seen, the concepts as described above may be used for enabling efficient resource selection for D2D communication. In particular, the concepts may help to minimize adverse impacts of DRX or similar procedures involving temporary switching to an inactive reception state. Further, the concepts may be applied in connection with various types of existing resource selection processes or existing DRX mechanisms.

It is to be understood that the examples and embodiments as explained above are merely illustrative and susceptible to various modifications. For example, the illustrated concepts may be applied in connection with various kinds of radio technologies and D2D communication, without limitation the SL mode of the LTE technology or NR technology, e.g., in connection with WLAN technologies or other wireless ad-hoc network technologies. Further, the concepts may be applied with respect to various types of UEs, without limitation to vehicle-based UEs. Further, the concepts may be applied in connection with various services supported by D2D communication, without limitation to V2X, NSPS, or NCIS.

Further, it is noted that although the examples described above assume an autonomous resource allocation process performed by the TX UE, similar processes could also be defined for network-based or network assisted resource selection processes. Such modifications may involve that the TX UE provides some information required for the resource selection process to the network node which allocates the radio resources for the intended D2D transmission. For example, such information could include HARQ feedback information from the RX UE. Accordingly, while the above illustrated examples assume that the selection of radio resources is performed by the TX UE, it would also be possible that the selection of radio resources is performed by a network node, e.g., an access node, such as the above-mentioned access node 100. In such variants, for example steps 910, 920, 930, and 950 of FIG. 9 could be performed by the network node, in order to select at least one radio resource for the D2D transmission from the wireless communication device to the further wireless communication device.

Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

EMBODIMENTS

In view of the above, embodiments provided in the present disclosure include:

Embodiment 1

A method of controlling device-to-device, D2D, communication in a wireless communication network, the method comprising:

a wireless communication device (10; 1000; 1500) determining that a further wireless communication device (10; 1000; 1200; 1500) is configured to switch between an inactive reception state and an active reception state;

based on when the further wireless communication device (10; 1000; 1200; 1500) will be in the active reception state, the wireless communication device (10; 1000; 1500) determining a candidate set of radio resources; and from the candidate set of radio resources, the wireless communication device (10; 1000; 1500) selecting at least one radio resource for a D2D transmission from the wireless communication device (10; 1000; 1500) to the further wireless communication device (10; 1000; 1200; 1500).

Embodiment 2

The method according to embodiment 1, comprising:

based on control signaling to the further wireless communication device (10; 1000; 1200; 1500), the wireless communication device (10; 1000; 1500) determining when the further wireless communication device (10; 1000; 1200; 1500) will be in the active reception state.

Embodiment 3

The method according to embodiment 2,
wherein the control signaling to the further wireless communication device (10; 1000; 1200; 1500) comprises control signaling from the wireless communication device (10; 1000; 1500).

Embodiment 4

The method according to embodiment 2 or 3,
wherein the control signaling to the further wireless communication device (10; 1000; 1200; 1500) comprises control signaling from a node (100; 1400; 1600) of the wireless communication network.

Embodiment 5

The method according to any one of embodiments 2 to 4,
wherein the control signaling comprises control signaling for configuring a duration of a timer for controlling switching of the further wireless communication device (10; 1000; 1200; 1500) between the inactive reception state and the active reception state.

Embodiment 6

The method according to any one of embodiments 2 to 5,
wherein the control signaling comprises control signaling for triggering switching between the inactive reception state and the active reception state.

Embodiment 7

The method according to any one of embodiments 1 to 6, comprising:
based on one or more transmissions to the further wireless communication device (10; 1000; 1200; 1500), the wireless communication device (10; 1000; 1500) determining when the further wireless communication device (10; 1000; 1200; 1500) will be in the active reception state.

Embodiment 8

The method according to embodiment 7,
wherein the one or more transmissions to the further wireless communication device (10; 1000; 1200; 1500) comprise one or more expected D2D transmissions from the wireless communication device (10; 1000; 1500) to the further wireless communication device (10; 1000; 1200; 1500).

Embodiment 9

The method according to embodiment 8,
wherein the one or more expected D2D transmissions comprise a D2D transmission scheduled by an assignment transmitted by the wireless communication device (10; 1000; 1500).

Embodiment 10

The method according to embodiment 8,
wherein the one or more expected D2D transmissions comprise a D2D transmission on reserved radio resources.

Embodiment 11

The method according to any one of embodiments 8 to 10,
wherein the one or more expected D2D transmissions comprise a retransmission of another D2D transmission from the wireless communication device (10; 1000; 1500) to the further wireless communication device (10; 1000; 1200; 1500).

Embodiment 12

The method according to embodiment 11,
wherein the retransmission is triggered based on acknowledgement feedback from the further wireless communication device (10; 1000; 1200; 1500).

Embodiment 13

The method according to embodiment 11 or 12,
wherein the retransmission is scheduled based on a reservation of resources before sending the other D2D transmission.

Embodiment 14

The method according to any one of embodiments 1 to 13, comprising:
based on one or more transmissions from the further wireless communication device (10; 1000; 1200; 1500), the wireless communication device (10; 1000; 1500) determining when the further wireless communication device (10; 1000; 1200; 1500) will be in the active reception state.

Embodiment 15

The method according to embodiment 14,
wherein the one or more transmissions from the further wireless communication device (10; 1000; 1200; 1500) comprise a scheduling request.

Embodiment 16

The method according to any one of embodiments 1 to 15, comprising:
wherein the candidate set of radio resources is based on one or more time intervals when the further wireless communication device (10; 1000; 1200; 1500) will be in the active reception state.

Embodiment 17

The method according to embodiment 16,
wherein the one or more time intervals when the further wireless communication device (10; 1000; 1200; 1500) will be in the active reception state include at least one first time interval in which a periodically triggered first timer causes the further wireless communication device (10; 1000; 1200; 1500) to be in the active reception state.

Embodiment 18

The method according to embodiment 16 or 17,
wherein the one or more time intervals when the further wireless communication device (10; 1000; 1200; 1500) will be in the active reception state include at least one second time interval in which a second timer triggered by a D2D transmission to the further wireless communication device (10; 1000; 1200; 1500) causes the further wireless communication device (10; 1000; 1200; 1500) to be in the active reception state.

Embodiment 19

The method according to any one of embodiments 16 to 18, wherein the one or more time intervals when the further wireless communication device (10; 1000; 1200; 1500) will be in the active reception state include at least one third time interval in which a third timer triggered by a transmission from the further wireless communication device (10; 1000; 1200; 1500) causes the further wireless communication device (10; 1000; 1200; 1500) to be in the active reception state.

Embodiment 20

The method according to any one of embodiments 16 to 19, comprising:

depending on whether the D2D transmission from the wireless communication device to the further wireless communication device (10; 1000; 1200; 1500) is a retransmission, the wireless communication device (10; 1000; 1500) selecting the one or more time intervals to include at least one second time interval in which a second timer triggered by a D2D transmission to the further wireless communication device (10; 1000; 1200; 1500) causes the further wireless communication device (10; 1000; 1200; 1500) to be in the active reception state and/or include at least one third time interval in which a third timer triggered by a transmission from the further wireless communication device (10; 1000; 1200; 1500) causes the further wireless communication device (10; 1000; 1200; 1500) to be in the active reception state.

Embodiment 21

The method according to any one of embodiments 16 to 20, comprising:

depending on whether the selection of the at least one radio resource is an initial selection or a re-selection, the wireless communication device (10; 1000; 1500) selecting the one or more time intervals to include at least one second time interval in which a second timer triggered by a D2D transmission to the further wireless communication device (10; 1000; 1200; 1500) causes the further wireless communication device (10; 1000; 1200; 1500) to be in the active reception state and/or include at least one third time interval in which a third timer triggered by a transmission from the further wireless communication device (10; 1000; 1200; 1500) causes the further wireless communication device (10; 1000; 1200; 1500) to be in the active reception state.

Embodiment 22

The method according to any one of embodiments 16 to 21, comprising:

depending on a priority of the D2D transmission from the wireless communication device to the further wireless communication device (10; 1000; 1200; 1500), the wireless communication device (10; 1000; 1500)

selecting the one or more time intervals to include at least one second time interval in which a second timer triggered by a D2D transmission to the further wireless communication device (10; 1000; 1200; 1500) causes the further wireless communication device (10; 1000; 1200; 1500) to be in the active reception state and/or include at least one third time interval in which a third timer triggered by a transmission from the further wireless communication device (10; 1000; 1200; 1500) causes the further wireless communication device (10; 1000; 1200; 1500) to be in the active reception state.

Embodiment 23

The method according to any one of embodiments 16 to 22, comprising:

depending on a delay requirement of the D2D transmission from the wireless communication device (10; 1000; 1500) to the further wireless communication device (10; 1000; 1200; 1500), the wireless communication device (10; 1000; 1500) selecting the one or more time intervals to include at least one second time interval in which a second timer triggered by a D2D transmission to the further wireless communication device (10; 1000; 1200; 1500) causes the further wireless communication device (10; 1000; 1200; 1500) to be in the active reception state and/or include at least one third time interval in which a third timer triggered by a transmission from the further wireless communication device (10; 1000; 1200; 1500) causes the further wireless communication device (10; 1000; 1200; 1500) to be in the active reception state.

Embodiment 24

The method according to any one of embodiments 16 to 23, comprising:

depending on a congestion level of radio resources, the wireless communication device (10; 1000; 1500) selecting the one or more time intervals to include at least one second time interval in which a second timer triggered by a D2D transmission to the further wireless communication device (10; 1000; 1200; 1500) causes the further wireless communication device (10; 1000; 1200; 1500) to be in the active reception state and/or include at least one third time interval in which a third timer triggered by a transmission from the further wireless communication device (10; 1000; 1200; 1500) causes the further wireless communication device (10; 1000; 1200; 1500) to be in the active reception state.

Embodiment 25

The method according to any one of embodiments 16 to 24, comprising:

depending on configuration information provided by the wireless communication network, the wireless communication device (10; 1000; 1500) selecting the one or more time intervals to include at least one second time interval in which a second timer triggered by a D2D transmission to the further wireless communication device (10; 1000; 1200; 1500) causes the further wireless communication device (10; 1000; 1200; 1500) to be in the active reception state and/or include at least one third time interval in which a third timer triggered by a transmission from the further wireless communication device (10; 1000; 1200; 1500) causes the further wireless communication device (10; 1000; 1200; 1500) to be in the active reception state.

Embodiment 26

The method according to any one of embodiments 1 to 25, comprising:
the wireless communication device (10; 1000; 1500) selecting the candidate set of radio resources from a selection window indicating radio resources allowed to be used for a D2D transmission by the wireless communication device (10; 1000; 1500).

Embodiment 27

The method according to any one of embodiments 1 to 26, comprising:
the wireless communication device (10; 1000; 1500) monitoring radio resources to estimate an expected occupation status of radio resources in the candidate set of radio resources; and based on the estimated expected occupation status of the radio resources in the candidate set of radio resources, the wireless communication device (10; 1000; 1500) selecting the at least one radio resource for the D2D transmission from the wireless communication device (10; 1000; 1500) to the further wireless communication device (10; 1000; 1200; 1500).

Embodiment 28

The method according to embodiment 27,
wherein at least a part of the radio resources monitored by the wireless communication device (10; 1000; 1500) are indicated by a sensing window.

Embodiment 29

The method according to embodiment 27 or 28,
wherein the wireless communication device (10; 1000; 1500) is configured to switch between an inactive reception state and an active reception state; and
wherein the wireless communication device (10; 1000; 1500) performs the monitoring of the radio resources to estimate the expected occupation status in response to a periodically triggered timer causing the wireless communication device (10; 1000; 1500) to be in the active reception state.

Embodiment 30

The method according to any one of embodiments 27 to 29,
wherein the wireless communication device (10; 1000; 1500) is configured to switch between an inactive reception state and an active reception state; and
wherein the wireless communication device (10; 1000; 1500) performs the monitoring of the radio resources to estimate the expected occupation status in response to a D2D transmission received by the wireless communication device (10; 1000; 1500) causing the wireless communication device (10; 1000; 1500) to be in the active reception state.

Embodiment 31

The method according to any one of embodiments 27 to 30,
wherein the wireless communication device (10; 1000; 1500) performs the monitoring of the radio resources to estimate the expected occupation status in response to a D2D transmission from the wireless communication device (10; 1000; 1500) causing the wireless communication device (10; 1000; 1500) to be in the active reception state.

Embodiment 32

The method according to any one of embodiments 27 to 31,
wherein the wireless communication device (10; 1000; 1500) performs the monitoring of the radio resources to estimate the expected occupation status in response to an expected D2D transmission to the wireless communication device (10; 1000; 1500) causing the wireless communication device (10; 1000; 1500) to be in the active reception state.

Embodiment 33

The method according to any one of embodiments 27 to 32,
wherein the wireless communication device (10; 1000; 1500) is configured to switch between an inactive reception state and an active reception state; and
wherein the wireless communication device (10; 1000; 1500) performs the monitoring of the radio resources to estimate the expected occupation status in response to an expected retransmission of a D2D transmission to the wireless communication device (10; 1000; 1500) causing the wireless communication device (10; 1000; 1500) to be in the active reception state.

Embodiment 34

The method according to any one of embodiments 27 to 33,
wherein the wireless communication device (10; 1000; 1500) is configured to switch between an inactive reception state and an active reception state, and
wherein the switching between the inactive reception state and the active reception state is controlled based on a need to perform the monitoring of the radio resources to estimate the expected occupation status of radio resources in the candidate set of radio resources.

Embodiment 35

The method according to embodiment 34, comprising:
in response to a need to perform resource selection for the D2D transmission from the wireless communication device (10; 1000; 1500) to the further wireless communication device (10; 1000; 1200; 1500), the wireless communication device (10; 1000; 1500) controlling the switching of the wireless communication device (10; 1000; 1500) between the inactive reception state and the active reception state to continuously keep the wireless communication device (10; 1000; 1500) in the active reception state for a monitoring interval; and
during the monitoring interval, the wireless communication device (10; 1000; 1500) monitoring radio resources to estimate the expected occupation status of radio resources in the candidate set of radio resources.

Embodiment 36

The method according to embodiment 35,
wherein the monitoring interval has an end time defined by a time gap before the candidate set of radio resources.

Embodiment 37

The method according to embodiment 36,
wherein the time gap before the candidate set of radio resources depends on a time required to switch the wireless communication device (10; 1000; 1500) from reception mode to transmission mode.

Embodiment 38

The method according to embodiment 36 or 37,
wherein the time gap before the candidate set of radio resources is defined by network operator configuration or by pre-configuration of the wireless communication device (10; 1000; 1500).

Embodiment 39

The method according to any one of embodiments 35 to 38,
wherein a duration of the monitoring interval is defined by network operator configuration or by pre-configuration of the wireless communication device (10; 1000; 1500).

Embodiment 40

The method according to any one of embodiments 35 to 39,
wherein a duration of the monitoring interval depends on a priority of the D2D transmission from the wireless communication device (10; 1000; 1500) to the further wireless communication device (10; 1000; 1200; 1500).

Embodiment 41

The method according to any one of embodiments 35 to 40,
wherein a duration of the monitoring interval depends on a congestion level of the radio resources.

Embodiment 42

The method according to any one of embodiments 35 to 41,
wherein the D2D transmission from the from the wireless communication device (10; 1000; 1500) to the further wireless communication device (10; 1000; 1200; 1500) is performed on at least one radio resource reserved for periodic D2D transmissions, and
wherein the monitoring interval has a start time defined by a configured time gap before the at least one resource reserved for periodic D2D transmissions.

Embodiment 43

The method according to any one of embodiments 35 to 42, comprising:
depending on at least one additional condition, the wireless communication device (10; 1000; 1500) selecting whether to control the switching of the wireless communication device (10; 1000; 1500) between the inactive reception state and the active reception state to continuously keep the wireless communication device (10; 1000; 1500) in the active reception state for the monitoring interval.

Embodiment 44

The method according to embodiment 43,
wherein the at least one additional condition comprises a condition related to a characteristic of data traffic to be conveyed in the D2D transmission from the wireless communication device (10; 1000; 1500) to the further wireless communication device (10; 1000; 1200; 1500).

Embodiment 45

The method according to embodiment 43 or 44,
wherein the at least one additional condition is defined by network operator configuration or by pre-configuration of the wireless communication device (10; 1000; 1500).

Embodiment 46

The method according to any one of embodiments 35 to 45, comprising:
the wireless communication device (10; 1000; 1500) performing, from the candidate set of radio resources, an initial selection of the at least one radio resource for the D2D transmission from the wireless communication device (10; 1000; 1500) to the further wireless communication device (10; 1000; 1200; 1500);
based on the monitoring of the radio resources during the monitoring interval, the wireless communication device (10; 1000; 1500) estimating the expected occupation status in the candidate set of radio resources; and
based on the estimated expected occupation status, the wireless communication device (10; 1000; 1500) performing, from the candidate set of radio resources, a re-selection of the at least one radio resource for the D2D transmission from the wireless communication device (10; 1000; 1500) to the further wireless communication device (10; 1000; 1200; 1500).

Embodiment 47

The method according to any one of embodiments 35 to 46, comprising:
the wireless communication device (10; 1000; 1500) monitoring radio resources to obtain a first estimate of the expected occupation status of the radio resources in the candidate set of radio resources in response to the wireless communication device (10; 1000; 1500) being caused to be in the active reception state by at least one of: a periodically triggered timer, a D2D transmission received by the wireless communication device (10; 1000; 1500), a D2D transmission from the wireless communication device (10; 1000; 1500), an expected D2D transmission to the wireless communication device (10; 1000; 1500), and an expected retransmission of a D2D transmission to the wireless communication device (10; 1000; 1500);

based on the first estimate of the expected occupation status, the wireless communication device (10; 1000; 1500) performing, from the candidate set of radio resources, an initial selection of the at least one radio resource for the D2D transmission from the wireless communication device (10; 1000; 1500) to the further wireless communication device (10; 1000; 1200; 1500);

based on the monitoring of the radio resources during the monitoring interval, the wireless communication device (10; 1000; 1500) obtaining a second estimate of the expected occupation status in the candidate set of radio resources; and based on the second estimate of the expected occupation status, the wireless communication device (10; 1000; 1500) performing, from the candidate set of radio resources, a re-selection of the at least one radio resource for the D2D transmission from the wireless communication device (10; 1000; 1500) to the further wireless communication device (10; 1000; 1200; 1500).

Embodiment 48

The method according to embodiment 46 or 47, wherein the monitoring interval has an end time defined by a time gap before the at least one radio resource selected in the initial selection.

Embodiment 49

The method according to embodiment 48, wherein the time gap before the at least one radio resource selected in the initial selection depends on a time required to switch the wireless communication device (10; 1000; 1500) from reception mode to transmission mode.

Embodiment 50

The method according to embodiment 48 or 49, wherein the time gap before the at least one radio resource selected in the initial selection is defined by network operator configuration or by pre-configuration of the wireless communication device (10; 1000; 1500).

Embodiment 51

The method according to any one of embodiments 1 to 50, wherein the active reception state and the inactive reception state correspond to an active state and an inactive state of discontinuous reception, DRX.

Embodiment 52

The method according to any one of embodiments 1 to 51, wherein the D2D transmission from the wireless communication device (10; 1000; 1500) to the further wireless communication device (10; 1000; 1200; 1500) is a D2D transmission to a group of further wireless communication devices (10; 1000; 1200; 1500) each configured to switch between an inactive reception state and an active reception state.

Embodiment 53

The method according to any one of embodiments 1 to 52, wherein the wireless communication device (10; 1000; 1500) determines the candidate set of radio resources based on when at least one of the group of further wireless communication device (10; 1000; 1200; 1500) will be in the active reception state.

Embodiment 54

The method according to embodiment 53, wherein the wireless communication device (10; 1000; 1500) determines the candidate set of radio resources based on when at least minimum percentage of the group of further wireless communication device (10; 1000; 1200; 1500) will be in the active reception state.

Embodiment 55

The method according to embodiment 53 or 54, wherein the D2D transmission to the group of further wireless communication devices (10; 1000; 1200; 1500) is a groupcast transmission or a broadcast transmission.

Embodiment 56

A method of controlling device-to-device, D2D, communication in a wireless communication network, the method comprising:

a wireless communication device (10; 1200; 1500) switching between an inactive reception state and an active reception state;

in response to the wireless communication device (10; 1200; 1500) being in the active reception state, the wireless communication device (10; 1200; 1500) monitoring radio resources to estimate an expected occupation status of radio resources in a candidate set of radio resources; and based on the estimated expected occupation status of the radio resources in the candidate set of radio resources, the wireless communication device (10; 1200; 1500) selecting at least one radio resource for a D2D transmission from the wireless communication device (10; 1200; 1500) to a further wireless communication device (10; 1000; 1200; 1500).

Embodiment 57

The method according to embodiment 56, wherein the wireless communication device (10; 1200; 1500) performs the monitoring of the radio resources to estimate the expected occupation status in response to a periodically triggered timer causing the wireless communication device (10; 1200; 1500) to be in the active reception state.

Embodiment 58

The method according to embodiment 56 or 57, wherein the wireless communication device (10; 1200; 1500) performs the monitoring of the radio resources to estimate the expected occupation status in response to a D2D transmission received by the wireless communication device (10; 1200; 1500) causing the wireless communication device (10; 1200; 1500) to be in the active reception state.

Embodiment 59

The method according to any one of embodiments 56 to 58,
wherein the wireless communication device (10; 1200; 1500) performs the monitoring of the radio resources to estimate the expected occupation status in response to a D2D transmission from the wireless communication device (10; 1200; 1500) causing the wireless communication device (10; 1200; 1500) to be in the active reception state.

Embodiment 60

The method according to any one of embodiments 56 to 59,
wherein the wireless communication device (10; 1200; 1500) performs the monitoring of the radio resources to estimate the expected occupation status in response to an expected D2D transmission to the wireless communication device (10; 1200; 1500) causing the wireless communication device (10; 1200; 1500) to be in the active reception state.

Embodiment 61

The method according to any one of embodiments 56 to 60,
wherein the wireless communication device (10; 1200; 1500) performs the monitoring of the radio resources to estimate the expected occupation status in response to an expected retransmission of a D2D transmission to the wireless communication device (10; 1200; 1500) causing the wireless communication device (10; 1200; 1500) to be in the active reception state.

Embodiment 62

The method according to any one of embodiments 56 to 61,
wherein the switching between the inactive reception state and the active reception state is controlled based on a need to perform the monitoring of the radio resources to estimate the expected occupation status of radio resources in the candidate set of radio resources.

Embodiment 63

The method according to embodiment 62, comprising:
in response to a need to perform resource selection for the D2D transmission from the wireless communication device (10; 1200; 1500) to the further wireless communication device (10; 1000; 1200; 1500), the wireless communication device (10; 1200; 1500) controlling the switching of the wireless communication device (10; 1200; 1500) between the inactive reception state and the active reception state to continuously keep the wireless communication device (10; 1200; 1500) in the active reception state for a monitoring interval; and
during the monitoring interval, the wireless communication device (10; 1200; 1500) monitoring radio resources to estimate the expected occupation status of radio resources in the candidate set of radio resources.

Embodiment 64

The method according to embodiment 63,
wherein the monitoring interval has an end time defined by a time gap before the candidate set of radio resources.

Embodiment 65

The method according to embodiment 64,
wherein the time gap before the candidate set of radio resources depends on a time required to switch the wireless communication device (10; 1200; 1500) from reception mode to transmission mode.

Embodiment 66

The method according to embodiment 64 or 65,
wherein the time gap before the candidate set of radio resources is defined by network operator configuration or by pre-configuration of the wireless communication device (10; 1200; 1500).

Embodiment 67

The method according to any one of embodiments 63 to 66,
wherein a duration of the monitoring interval is defined by network operator configuration or by pre-configuration of the wireless communication device (10; 1200; 1500).

Embodiment 68

The method according to any one of embodiments 63 to 67,
wherein a duration of the monitoring interval depends on a priority of the D2D transmission from the wireless communication device (10; 1200; 1500) to the further wireless communication device (10; 1000; 1200; 1500).

Embodiment 69

The method according to any one of embodiments 63 to 68,
wherein a duration of the monitoring interval depends on a congestion level of the radio resources.

Embodiment 70

The method according to any one of embodiments 63 to 69,
wherein the D2D transmission from the wireless communication device (10; 1200; 1500) to the further wireless communication device (10; 1000; 1200; 1500) is performed on radio resources reserved for periodic D2D transmissions, and
wherein the monitoring interval has a start time defined by a configured time gap before the at least one radio resource reserved for periodic D2D transmissions.

Embodiment 71

The method according to any one of embodiments 63 to 70, comprising:

depending on at least one additional condition, the wireless communication device (10; 1200; 1500) selecting whether to control the switching of the wireless communication device (10; 1200; 1500) between the inactive reception state and the active reception state to continuously keep the wireless communication device (10; 1200; 1500) in the active reception state for the monitoring interval.

Embodiment 72

The method according to embodiment 71, wherein the at least one additional condition comprises a condition related to a characteristic of data traffic to be conveyed in the D2D transmission from the wireless communication device (10; 1200; 1500) to the further wireless communication device (10; 1000; 1200; 1500).

Embodiment 73

The method according to embodiment 71 or 72, wherein the at least one additional condition is defined by network operator configuration or by pre-configuration of the wireless communication device (10; 1200; 1500).

Embodiment 74

The method according to any one of embodiments 63 to 73, comprising:

the wireless communication device (10; 1200; 1500) performing, from the candidate set of radio resources, an initial selection of the at least one radio resource for the D2D transmission from the wireless communication device (10; 1200; 1500) to the further wireless communication device (10; 1000; 1200; 1500);

based on the monitoring of the radio resources during the monitoring interval, the wireless communication device (10; 1200; 1500) estimating the expected occupation status in the candidate set of radio resources; and based on the estimated expected occupation status, the wireless communication device (10; 1200; 1500) performing, from the candidate set of radio resources, a re-selection of the at least one radio resource for the D2D transmission from the wireless communication device (10; 1200; 1500) to the further wireless communication device (10; 1000; 1200; 1500).

Embodiment 75

The method according to any one of embodiments 63 to 74, comprising:

the wireless communication device (10; 1200; 1500) monitoring radio resources to obtain a first estimate of the expected occupation status in the candidate set of radio resources in response to the wireless communication device (10; 1200; 1500) being caused to be in the active reception state by at least one of: a periodically triggered timer, a D2D transmission received by the wireless communication device (10; 1200; 1500), a D2D transmission from the wireless communication device (10; 1200; 1500), an expected D2D transmission to the wireless communication device (10; 1200; 1500), and an expected retransmission of a D2D transmission to the wireless communication device (10; 1200; 1500);

based on the first estimate of the expected occupation status, the wireless communication device (10; 1200; 1500) performing, from the candidate set of radio resources, an initial selection of the at least one radio resource for the D2D transmission from the wireless communication device (10; 1200; 1500) to the further wireless communication device (10; 1000; 1200; 1500);

based on the monitoring of the radio resources during the monitoring interval, the wireless communication device (10; 1200; 1500) obtaining a second estimate of the expected occupation status in the candidate set of radio resources; and based on the second estimate of the expected occupation status, the wireless communication device (10; 1200; 1500) performing, from the candidate set of radio resources, a re-selection of the at least one radio resource for the D2D transmission from the wireless communication device (10; 1200; 1500) to the further wireless communication device (10; 1000; 1200; 1500).

Embodiment 76

The method according to embodiment 74 or 75, wherein the monitoring interval has an end time defined by a time gap before the at least one radio resource selected in the initial selection.

Embodiment 77

The method according to embodiment 76, wherein the time gap before the at least one radio resource selected in the initial selection depends on a time required to switch the wireless communication device (10; 1200; 1500) from reception mode to transmission mode.

Embodiment 78

The method according to embodiment 76 or 77, wherein the time gap before the radio resources selected in the initial selection is defined by network operator configuration or by pre-configuration of the wireless communication device (10; 1200; 1500).

Embodiment 79

The method according to any one of embodiments 56 to 78, comprising:

the wireless communication device (10; 1200; 1500) selecting the candidate set of radio resources from a selection window indicating radio resources allowed to be used for a D2D transmission by the wireless communication device (10; 1200; 1500).

Embodiment 80

The method according to any one of embodiments 56 to 79, wherein at least a part of the radio resources monitored by the wireless communication device (10; 1200; 1500) are indicated by a sensing window.

Embodiment 81

The method according to any one of embodiments 56 to 80, wherein the active reception state and the inactive reception state correspond to an active state and an inactive state of discontinuous reception, DRX.

Embodiment 82

The method according to any one of embodiments 56 to 81, wherein the D2D transmission from the wireless communication device (10; 1200; 1500) to the further wireless communication device (10; 1000; 1200; 1500) is a D2D transmission to a group of further wireless communication devices (10; 1000; 1200; 1500).

Embodiment 83

The method according to any one of embodiments 56 to 82, wherein the D2D transmission to the group of further wireless communication devices (10; 1000; 1200; 1500) is a groupcast transmission or a broadcast transmission.

Embodiment 84

A method of controlling device-to-device, D2D, communication in a wireless communication network, the method comprising:

a node (100; 1400; 1600) of the wireless communication network configuring a wireless communication device (10; 1000; 1500) to:

determine that a further wireless communication device (10; 1000; 1200; 1500) is configured to switch between an inactive reception state and an active reception state;

based on when the further wireless communication device (10; 1000; 1200; 1500) will be in the active reception state, determine a candidate set of radio resources; and from the candidate set of radio resources, select at least one radio resource for a D2D transmission from the wireless communication device (10; 1000; 1500) to the further wireless communication device (10; 1000; 1200; 1500).

Embodiment 85

The method according to embodiment 84, wherein the node (100; 1400; 1600) is configured to configure the wireless communication device (10; 1000; 1500) for operation according to a method according to any one of embodiments 1 to 55.

Embodiment 86

A method of controlling device-to-device, D2D, communication in a wireless communication network, the method comprising:

a node (100; 1400; 1600) of the wireless communication network configuring a wireless communication device (10; 1200; 1500) to:

if the wireless communication device (10; 1200; 1500) switches between an inactive reception state and an active reception state:

in response to the wireless communication device (10; 1200; 1500) being in an active reception state, monitor radio resources to estimate an expected occupation status of radio resources in the candidate set of radio resources; and based on the estimated expected occupation status of the radio resources in the candidate set of radio resources, select at least one radio resource for a D2D transmission from the wireless communication device (10; 1200; 1500) to a further wireless communication device (10; 1000; 1200; 1500).

Embodiment 87

The method according to embodiment 86, wherein the node (100; 1400; 1600) is configured to configure the wireless communication device (10; 1200; 1500) for operation according to a method according to any one of embodiments 56 to 83.

Embodiment 88

A wireless communication device (10; 1000; 1500), the wireless communication device (10; 1000; 1500) being configured to:

determine that a further wireless communication device (10; 1000; 1200; 1500) is configured to switch between an inactive reception state and an active reception state;

based on when the further wireless communication device (10; 1000; 1200; 1500) will be in the active reception state, determine a candidate set of radio resources; and from the candidate set of radio resources, select at least one radio resource for a D2D transmission from the wireless communication device (10; 1000; 1500) to the further wireless communication device (10; 1000; 1200; 1500).

Embodiment 89

The wireless communication device (10; 1000; 1500) according to embodiment 88, wherein the wireless communication device (10; 1000; 1500) is configured to perform a method according to any one of embodiments 2 to 55.

Embodiment 90

The wireless communication device (10; 1000; 1500) according to embodiment 88 or 89, comprising:

at least one processor (1550), and a memory (1560) containing program code executable by the at least one processor (1550), whereby execution of the program code by the at least one processor (1550) causes the wireless communication device (10; 1000; 1500) to perform a method according to any one of embodiments 1 to 55.

Embodiment 91

A wireless communication device (10; 1200; 1500), the wireless communication device (10; 1200; 1500) being configured to:

switch between an inactive reception state and an active reception state;

in response to the wireless communication device (10; 1200; 1500) being in the active reception state, monitor radio resources to estimate an expected occupation status of radio resources in a candidate set of radio resources; and based on the estimated expected occupation status of the radio resources in the candidate set of radio resources, select at least one radio resource for a D2D transmission from the wireless communication device (10; 1200; 1500) to a further wireless communication device (10; 1000; 1200; 1500).

Embodiment 92

The wireless communication device (10; 1200; 1500) according to embodiment 91, wherein the wireless communication device (10; 1200; 1500) is configured to perform a method according to any one of embodiments 53 to 79.

Embodiment 93

The wireless communication device (10; 1200; 1500) according to embodiment 91 or 92, comprising:

at least one processor (1550), and a memory (1560) containing program code executable by the at least one processor (1550), whereby execution of the program code by the at least one processor (1550) causes the wireless communication device (10; 1200; 1500) to perform a method according to any one of embodiments 56 to 83.

Embodiment 94

A node (100; 1400; 1600) for a wireless communication network, the node (100; 1400; 1600) being adapted to configure a wireless communication device (10; 1000; 1500) to:

determine that a further wireless communication device (10; 1000; 1200; 1500) is configured to switch between an inactive reception state and an active reception state;

based on when the further wireless communication device (10; 1000; 1200; 1500) will be in the active reception state, determine a candidate set of radio resources; and from the candidate set of radio resources, select at least one radio resource for a D2D transmission from the wireless communication device (10; 1000; 1500) to the further wireless communication device (10; 1000; 1200; 1500).

Embodiment 95

The node (100; 1400; 1600) according to embodiment 94, wherein the node (100; 1400; 1600) is adapted to configure the wireless communication device (10; 1000; 1500) for operation according to a method according to any one of embodiments 1 to 55.

Embodiment 96

The node (100; 1400; 1600) according to embodiment 94 or 95, comprising:

at least one processor (1650), and a memory (1660) containing program code executable by the at least one processor (1650), whereby execution of the program code by the at least one processor (1650) causes the node (100; 1400; 1600) to configure the wireless communication device (10; 1000; 1500) for operation according to a method according to any one of embodiments 1 to 55.

Embodiment 97

A node (100; 1400; 1600) for a wireless communication network, the node (100; 1400; 1600) being adapted to configure a wireless communication device (10; 1200; 1500) to:

if the wireless communication device (10; 1200; 1500) switches between an inactive reception state and an active reception state in response to the wireless communication device (10; 1200; 1500) being in an active reception state, monitor radio resources to estimate an expected occupation status of radio resources in the candidate set of radio resources; and based on the estimated expected occupation status of the radio resources in the candidate set of radio resources, select at least one radio resource for a D2D transmission from the wireless communication device (10; 1200; 1500) to a further wireless communication device (10; 1000; 1200; 1500).

Embodiment 98

The node (100; 1400; 1600) according to embodiment 97, wherein the node (100; 1400; 1600) is adapted to configure the wireless communication device (10; 1200; 1500) for operation according to a method according to any one of embodiments 56 to 83.

Embodiment 99

The node (100; 1400; 1600) according to embodiment 97 or 98, comprising:

at least one processor (1650), and a memory (1660) containing program code executable by the at least one processor (1650), whereby execution of the program code by the at least one processor (1650) causes the node (100; 1400; 1600) to configure the wireless communication device (10; 1200; 1500) for operation according to a method according to any one of embodiments 56 to 83.

Embodiment 100

A computer program or computer program product comprising program code to be executed by at least one processor of a wireless communication device (10; 1000; 1200; 1500), whereby execution of the program code causes the wireless communication device (10; 1000; 1200; 1500) to perform a method according to any one of embodiments 1 to 83.

The invention claimed is:

1. A method of controlling device-to-device (D2D) communication in a wireless communication network, the method comprising:

a wireless communication device determining that a further wireless communication device is configured to switch between an inactive reception state and an active reception state;

performing a D2D transmission from the wireless communication device to the further wireless communication device;

determining when the further wireless communication device will be in the active reception state, based on knowledge at the wireless communication device of a timer triggered at the further wireless communication device by the D2D transmission, wherein the further wireless communication device operates or remains in the active reception state according to the timer;

based on determining when the further wireless communication device will be in the active reception state, the wireless communication device determining a candidate set of radio resources; and from the candidate set of radio resources, the wireless communication device selecting at least one radio resource for a further D2D transmission from the wireless communication device to the further wireless communication device.

2. The method according to claim 1, wherein the D2D transmission is a transmission of control signaling.

3. The method according to claim 2, wherein the control signaling comprises a wakeup signal.

4. The method according to claim 1, wherein the D2D transmission is a transmission of a scheduling assignment to the further wireless communication device.

5. The method according to claim 4, wherein the further D2D transmission comprises a D2D transmission scheduled by the scheduling assignment.

6. The method according to claim 1, wherein the further D2D transmission is a retransmission of the D2D transmission.

7. The method according to claim 6, wherein the retransmission is triggered based on acknowledgement feedback from the further wireless communication device.

8. The method according to claim 1, wherein the candidate set of radio resources is based on one or more time intervals when the further wireless communication device will be in the active reception state; and wherein the timer is a retransmission timer and the further D2D transmission is a retransmission, and wherein the method includes determining the one or more time intervals based on knowledge at the wireless communication device of the duration of the retransmission timer.

9. The method according to claim 8, wherein the wireless communication device receives a negative acknowledgment (NACK) from the further wireless communication device in response to the D2D transmission, and wherein the wireless device determines the one or more time intervals based on reception of the NACK and knowledge of when the further wireless communication device starts the retransmission timer in relation to transmission of the NACK.

10. The method according to claim 1, wherein the wireless communication device has knowledge of a duration of the timer, with the further wireless communication device being in the active reception state while the timer is running, and has knowledge of a timing between the D2D transmission and starting of the timer at the further wireless communication device.

11. A wireless communication device, the wireless communication device comprising:

at least one processor, and a memory containing program code executable by the at least one processor, whereby execution of the program code by the at least one processor causes the wireless communication device to:

determine that a further wireless communication device is configured to switch between an inactive reception state and an active reception state;

perform a device-to-device (D2D) transmission to the further wireless communication device;

determine when the further wireless communication device will be in the active reception state, based on knowledge at the wireless communication device of a timer triggered at the further wireless communication device by the D2D transmission, wherein the further wireless communication device operates or remains in the active reception state according to the timer;

based on the determination of when the further wireless communication device will be in the active reception state, determine a candidate set of radio resources; and from the candidate set of radio resources, select at least one radio resource for a further D2D transmission from the wireless communication device to the further wireless communication device.

12. The wireless communication device according to claim 11, wherein the D2D transmission comprises the transmission of sidelink control information (SCI).

13. The wireless communication device according to claim 11, wherein the SCI comprise a wakeup signal.

14. The wireless communication device according to claim 13, wherein the D2D transmission is a scheduling assignment, and wherein the further D2D transmission is a D2D transmission scheduled by the scheduling assignment.

15. The wireless communication device according to claim 13, wherein the further D2D transmission is a retransmission of the D2D transmission, and the timer is a retransmission timer used by the further wireless communication device that determines when the further wireless communication device will be in the active reception state for reception of the retransmission.

16. The wireless communication device according to claim 15, wherein the candidate set of radio resources is based on one or more time intervals corresponding to when the further wireless communication device will be in the active reception state, according to the retransmission timer.

17. The wireless communication device of claim 11, wherein the wireless communication device is a connected vehicle.

18. A non-transitory computer readable medium storing computer program instructions that, when executed by at least one processor of a wireless communication device, cause the wireless communication device to:

determine that a further wireless communication device is configured to switch between an inactive reception state and an active reception state;

perform a device-to-device (D2D) transmission from the wireless communication device to the further wireless communication device;

determine when the further wireless communication device will be in the active reception state, based on knowledge at the wireless communication device of a timer triggered at the further wireless communication device by the D2D transmission, wherein the further wireless communication device operates or remains in the active reception state according to the timer;

based on the determination of when the further wireless communication device will be in the active reception state, determine a candidate set of radio resources; and from the candidate set of radio resources, select at least one radio resource for a further D2D transmission from the wireless communication device to the further wireless communication device.

* * * * *